US012233336B2

(12) United States Patent
Iba et al.

(10) Patent No.: US 12,233,336 B2
(45) Date of Patent: Feb. 25, 2025

(54) COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

(71) Applicant: NINTENDO CO., LTD., Kyoto (JP)

(72) Inventors: Keisuke Iba, Kyoto (JP); Hirotake Otsubo, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 287 days.

(21) Appl. No.: 17/941,475

(22) Filed: Sep. 9, 2022

(65) Prior Publication Data
US 2023/0310988 A1 Oct. 5, 2023

(30) Foreign Application Priority Data

Mar. 30, 2022 (JP) ................................. 2022-056480

(51) Int. Cl.
A63F 13/428 (2014.01)
A63F 13/211 (2014.01)
A63F 13/812 (2014.01)
G06N 20/00 (2019.01)

(52) U.S. Cl.
CPC .......... A63F 13/428 (2014.09); A63F 13/211 (2014.09); A63F 13/812 (2014.09); G06N 20/00 (2019.01)

(58) Field of Classification Search
CPC .... A63F 13/428; A63F 13/211; A63F 13/812; G06N 20/00
See application file for complete search history.

(56) References Cited

U.S. PATENT DOCUMENTS

2008/0242385 A1 10/2008 Miyamoto
2012/0115610 A1 5/2012 Otani et al.
2013/0296048 A1 11/2013 Jeffery et al.

FOREIGN PATENT DOCUMENTS

JP 2008-136697 6/2008
JP 2011-015753 1/2011
JP 2017-217489 12/2017

(Continued)

OTHER PUBLICATIONS

Nov. 21, 2023 Office Action issued in Japanese Patent Application No. 2022-056480, pp. 1-5 [machine translation included].

(Continued)

Primary Examiner — Werner G Garner
(74) Attorney, Agent, or Firm — Nixon & Vanderhye P.C.

(57) ABSTRACT

On the basis of operation data acquired from an operation device including an inertial sensor, whether or not a swing input to the operation device has been performed is determined. A learned model generated on the basis of a plurality of teacher data each associated with one of a plurality of swing directions, the learned model being for determining which swing direction out of the plurality of swing directions the operation device has been swung in, is managed. The operation data acquired in a period in which the swing input has been performed is inputted to the learned model, and a swing direction in which the operation device has been swung is determined on the basis of an output from the learned model corresponding to the input. Game processing is executed on the basis of the swing direction.

19 Claims, 23 Drawing Sheets

(56) References Cited

FOREIGN PATENT DOCUMENTS

| JP | 2019-170631 | 10/2019 |
|----|-------------|---------|
| JP | 2020-124389 | 8/2020  |

OTHER PUBLICATIONS

Aug. 22, 2023 Search Report issued in European Patent Application No. 23155848.7, pp. 1-12.
Jia Hong et al., "SwingNet: Ubiquitous Fine-Grained Swing Tracking Framework Via Stochastic Neural Architecture Search and Adversarial Learning," vol. 5, No. 3, Sep. 14, 2021, pp. 1-21.

F I G. 2 4
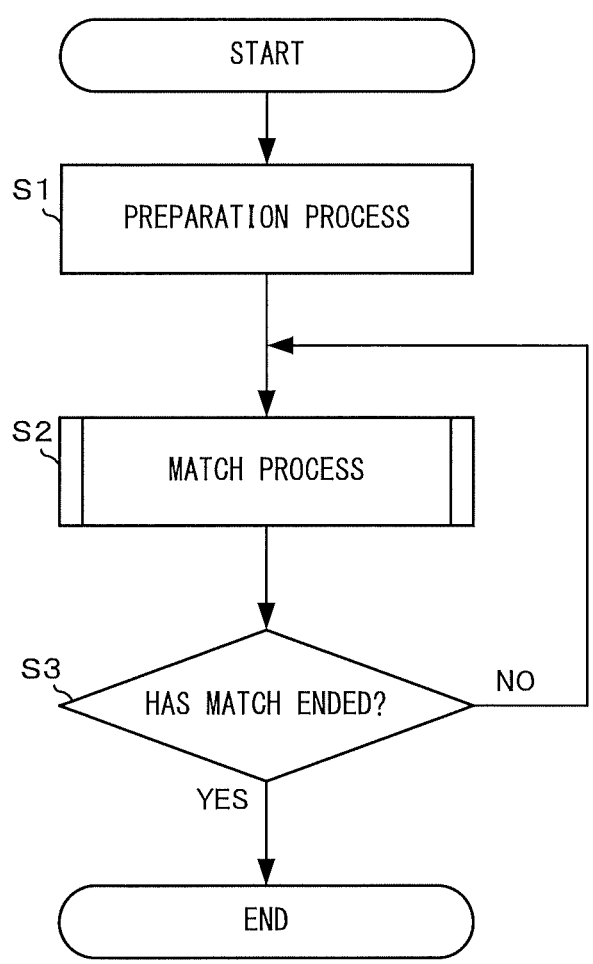

COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

CROSS REFERENCE TO RELATED APPLICATION

This application claims priority to Japanese Patent Application No. 2022-56480 filed on Mar. 30, 2022, the entire contents of which are incorporated herein by reference.

FIELD

The present disclosure relates to game processing that uses an input device including an inertial sensor.

BACKGROUND AND SUMMARY

To date, a game in which an input using an inertial sensor is performed and in which movement of an object is started according to a swing input of swinging a controller has been known.

In the above game, when a swing input has been performed at a predetermined timing, movement of a predetermined object is started in a virtual space.

In this regard, depending on a game content, it may be necessary to determine, with respect to a swing input performed by a user, what way of swinging has been performed or which direction the swing direction has been. Thus, for such a case, there has been room for improving accuracy of swing determination.

Therefore, an object of the present disclosure is to provide a computer-readable non-transitory storage medium having stored therein a game program that can improve determination accuracy of the way of swinging (swing direction) of an operation device according to a swing input, a game system, a game apparatus, and a game processing method.

Configuration examples for achieving the above object will be shown below.

In a configuration example, a computer-readable non-transitory storage medium has stored therein instructions that, when executed by a processor of an information processing apparatus, cause the information processing apparatus to perform the following operations. The operations include: acquiring, from an operation device including an inertial sensor, operation data based on an output from the inertial sensor; determining, on the basis of the operation data, whether or not a swing input to the operation device has been performed; managing a learned model generated on the basis of a plurality of teacher data each associated with one of a plurality of swing directions, the learned model being for determining which swing direction out of the plurality of swing directions the operation device has been swung in; inputting, to the learned model, the operation data acquired in a period in which the swing input has been performed, and determining a swing direction in which the operation device has been swung, on the basis of an output from the learned model corresponding to the input; and executing game processing on the basis of the swing direction in which the operation device has been determined to have been swung.

According to the above configuration example, the swing direction in which the operation device has been swung can be determined on the basis of a result obtained by inputting operation data regarding a swing input, to a learned model. Accordingly, determination accuracy of a swing input in the game processing can be improved.

In another configuration example, the operations may include at determination as to the swing direction, inputting, to the learned model, a plurality of the operation data progressively acquired in the period in which the swing input has been performed, and determining, on the basis of an output from the learned model corresponding to the input, the swing direction in which the operation device has been swung.

According to the above configuration example, the determination can be performed by using a plurality of operation data in the period in which the swing input has been performed. Accordingly, determination accuracy can be improved.

In another configuration example, the operations include at determination as to the swing input, when a magnitude of an acceleration indicated by acceleration data included in the acquired operation data has exceeded a threshold, determining that the swing input has been started, and at a cancelation timing after the magnitude of the acceleration has reached a peak, determining that the swing input has been ended, and at determination as to the swing direction, determining the swing direction on the basis of an output from the learned model corresponding to an input of a plurality of the operation data acquired from a time point at which the swing input has been started, till the cancelation timing.

According to the above configuration example, start and end of the swing input are determined on the basis of change in the acceleration. Thus, start and end of the swing input can be detected through a simple process. Further, determination using operation data in a more accurate swing input period can be performed.

In another configuration example, the operations may include by using degrees of similarity that are outputted when the operation data has been inputted to the learned model, and that respectively correspond to a plurality of swing directions, determining which swing direction out of the plurality of swing directions the operation device has been swung in.

According to the above configuration example, on the basis of similarities with the plurality of respective swing directions, the direction in which the operation device has been swung is determined. Accordingly, even when the operation device has been swung in a swing direction that is similar, to some extent, to a predetermined swing direction, it is possible to consider that the operation device has been swung in the predetermined swing direction. Accordingly, it is possible to perform determination in which individual differences in the ways of swinging of individual users are absorbed to some extent. Thus, determination accuracy can be improved.

In another configuration example, the operations may include when the degrees of similarity respectively corresponding to two or more swing directions out of the plurality of swing directions each satisfy a predetermined similarity condition, determining that the operation device has been swung in a swing direction associated with a highest degree of similarity.

According to the above configuration example, out of the swing directions each satisfying a similarity condition, a swing direction having the highest degree of similarity is selected and determined as the swing direction, and thus, determination accuracy can be further improved.

In another configuration example, the predetermined similarity condition regarding each degree of similarity may be set so as to be different in accordance with a situation of a game caused by execution of the game processing.

According to the above configuration example, the similarity condition can be dynamically changed in accordance with the situation of the game. Accordingly, in accordance with development of the game, a state where a predetermined swing input can be easily determined can be generated. For example, even in a situation where the motion of an arm of the user swinging the operation device tends to be small, it is possible to determine that the user has performed a predetermined swing input.

In another configuration example, each teacher data may include a first parameter including at least a magnitude of an acceleration or a magnitude of an angular velocity, and the operation data may include a second parameter including at least a magnitude of an acceleration or a magnitude of an angular velocity.

In another configuration example, the first parameter and the second parameter may each further include orientation data indicating an orientation of the operation device.

According to the above configuration example, determination of the degree of similarity can be performed by using the orientation data. Thus, determination accuracy can be further improved.

In another configuration example, the operations may include while it is determined that no swing input to the operation device has been performed, changing an orientation of a player character object placed in a virtual space, so as to be an orientation that corresponds to an orientation indicated by the orientation data calculated on the basis of the operation data.

According to the above configuration example, while the user is not swinging the operation device, change in the orientation of the operation device moved by the user is reflected in the orientation of the player character object. Thus, immersion in the game can be enhanced.

In another configuration example, the operations may include executing the game processing when it has been determined that a swing input to the operation device has been performed at a timing that satisfies an execution condition during a game.

According to the above configuration example, it is possible to provide a game characteristic of allowing the user to determine the timing of performing a swing input, and thus, entertainment characteristics of the game can be improved.

In another configuration example, the operations may include when it has been determined that a swing input to the operation device has been performed at a timing at which a position of a player character object placed in a virtual space and a position of a movement object are in a predetermined positional relationship, executing a process of moving the movement object on the basis of the swing direction in which the operation device has been determined to have been swung.

According to the above configuration example, in a game that progresses as a result of movement of a movement object, determination accuracy of the swing input for causing the movement can be improved, and thus, user experience in such a game can be improved.

In another configuration example, the operations may further include moving the movement object at a predetermined speed, and when a height in the virtual space of the movement object is less than a predetermined height, performing speed reduction so as to realize a speed less than the predetermined speed, to move the movement object.

According to the above configuration example, in a predetermined situation (e.g., a situation where the movement object is close to the ground), a time for performing a swing input can be provided to the user. Accordingly, a situation where swing determination can be easily performed can be provided, and user experience can be improved.

In another configuration example, the operations may include when the predetermined positional relationship and the swing direction in which the operation device has been determined to have been swung satisfy a predetermined condition, executing the game processing so as to be more advantageous than when the predetermined positional relationship and the swing direction do not satisfy the predetermined condition.

According to the above configuration example, it is possible to provide a game characteristic of allowing the user to perform a swing input so as to satisfy a predetermined condition, and thus, entertainment characteristics of the game can be improved.

In another configuration example, the operations may include when an output from the learned model indicates that there is no swing direction that satisfies the predetermined similarity condition, executing the game processing, assuming that no swing input to the operation device has been performed.

According to the above configuration example, when there is no similarity to any of the swing directions, game processing can be executed such that control is performed so as not to cause any action, for example. Thus, the user can be caused to recognize that an appropriate swing input has not been performed.

In another configuration example, the operations may include when an output from the learned model indicates that there is no swing direction that satisfies the predetermined similarity condition, changing an orientation of a player character object in accordance with change in an orientation of the operation device calculated on the basis of the operation data based on the period in which the swing input has been performed.

According to the above configuration example, the player character object can be caused to perform some action with respect to the swing input performed by the user.

In another configuration example, the operations may include at determination as to the swing direction, when an output from the learned model indicates that there is no swing direction that satisfies the predetermined similarity condition, determining that, although the similarity condition is not satisfied, the operation device has been swung in a swing direction having a highest similarity to a swing direction calculated from the operation data, and at execution of the game processing, executing the game processing on the basis of the swing direction.

According to the above configuration example, some game processing can be executed with respect to a swing input. Accordingly, it is possible to prevent occurrence of deadlock of the game progress as a result of a swing input not being received, or occurrence of disadvantageous development in terms of the game. Accordingly, the degree of difficulty of the game can be reduced.

According to the exemplary embodiment, determination accuracy of the swing input can be improved.

BRIEF DESCRIPTION OF THE DRAWINGS

FIG. 24 is a non-limiting example of a flowchart showing details of badminton game processing according to the exemplary embodiment;

DETAILED DESCRIPTION OF NON-LIMITING EXAMPLE EMBODIMENTS

Hereinafter, an exemplary embodiment will be described.

Hereinafter, a game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
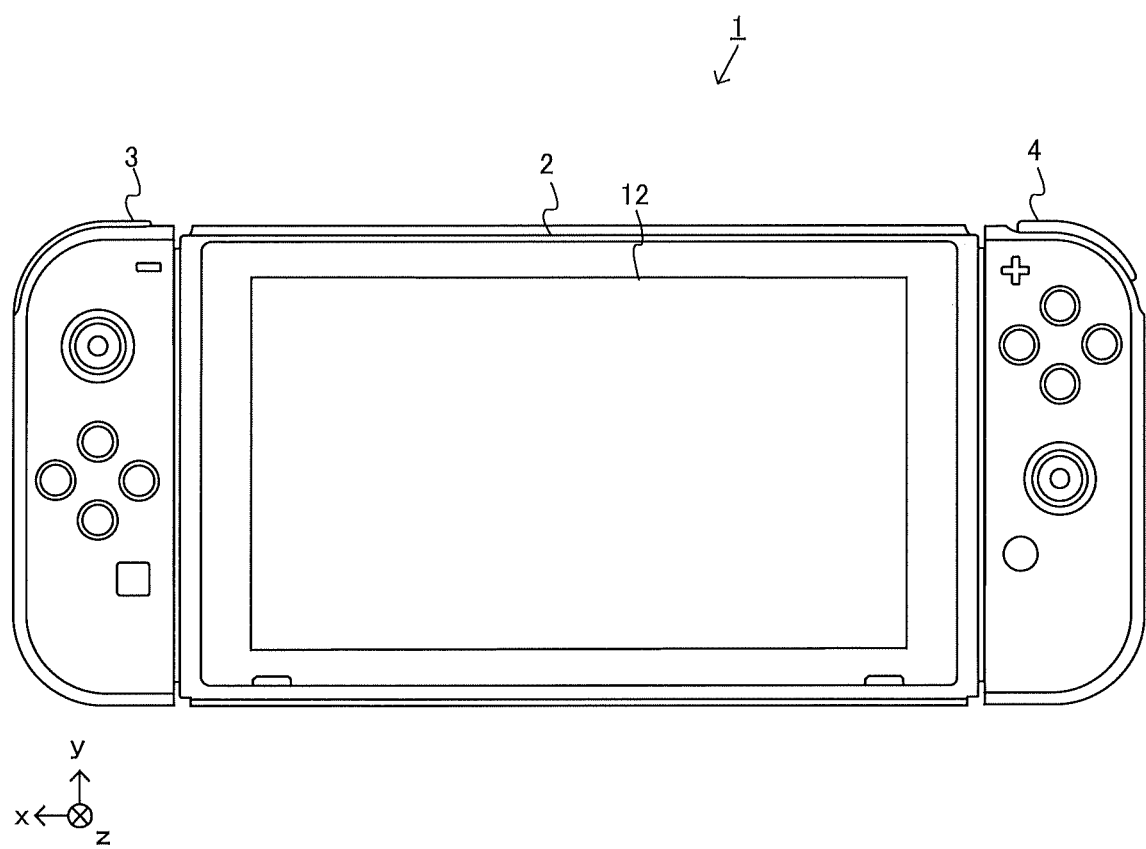
FIG. 1 shows a non-limiting example of a state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
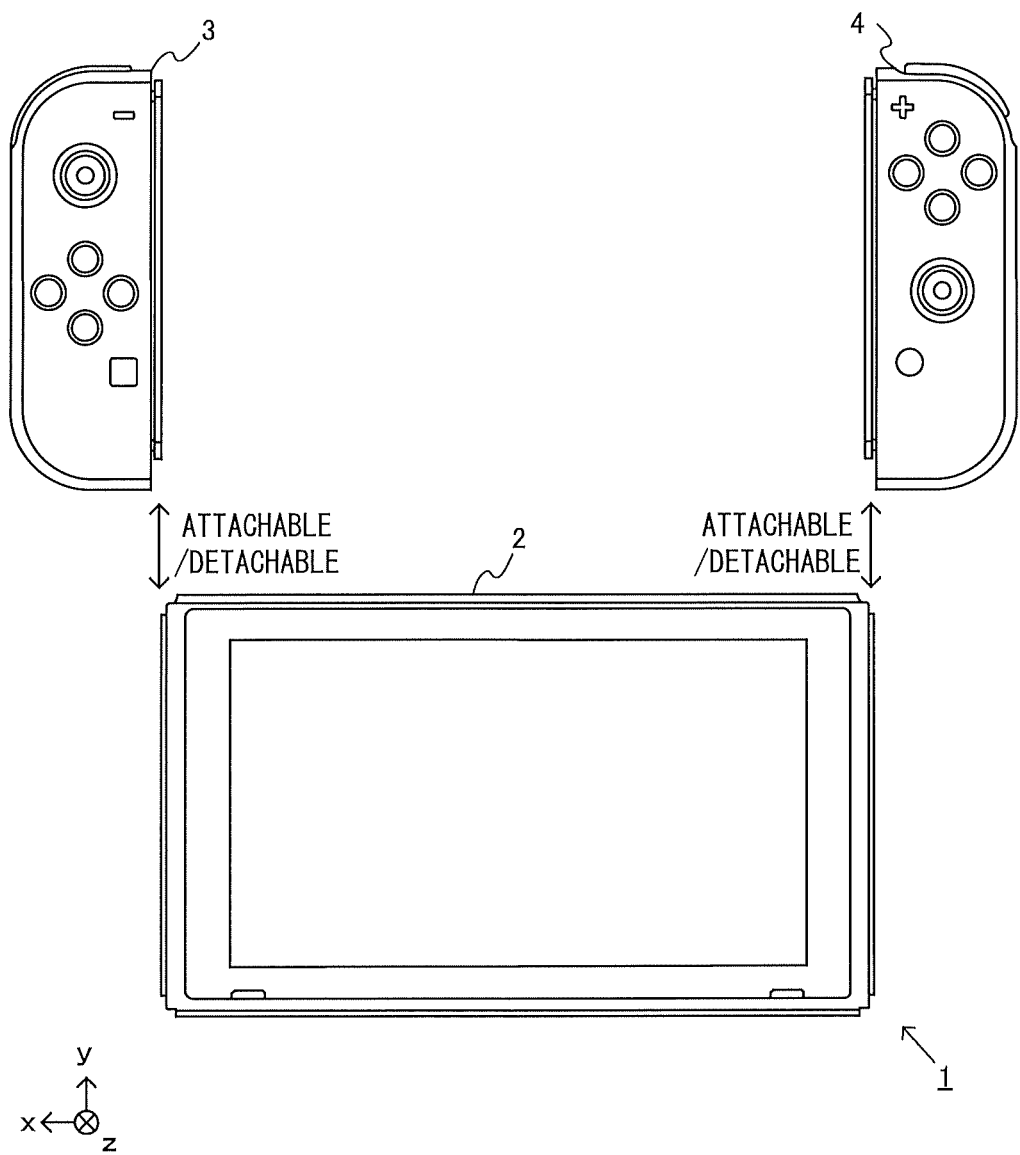
FIG. 2 shows a non-limiting example of a state where the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as a "controller".

Figure 3:
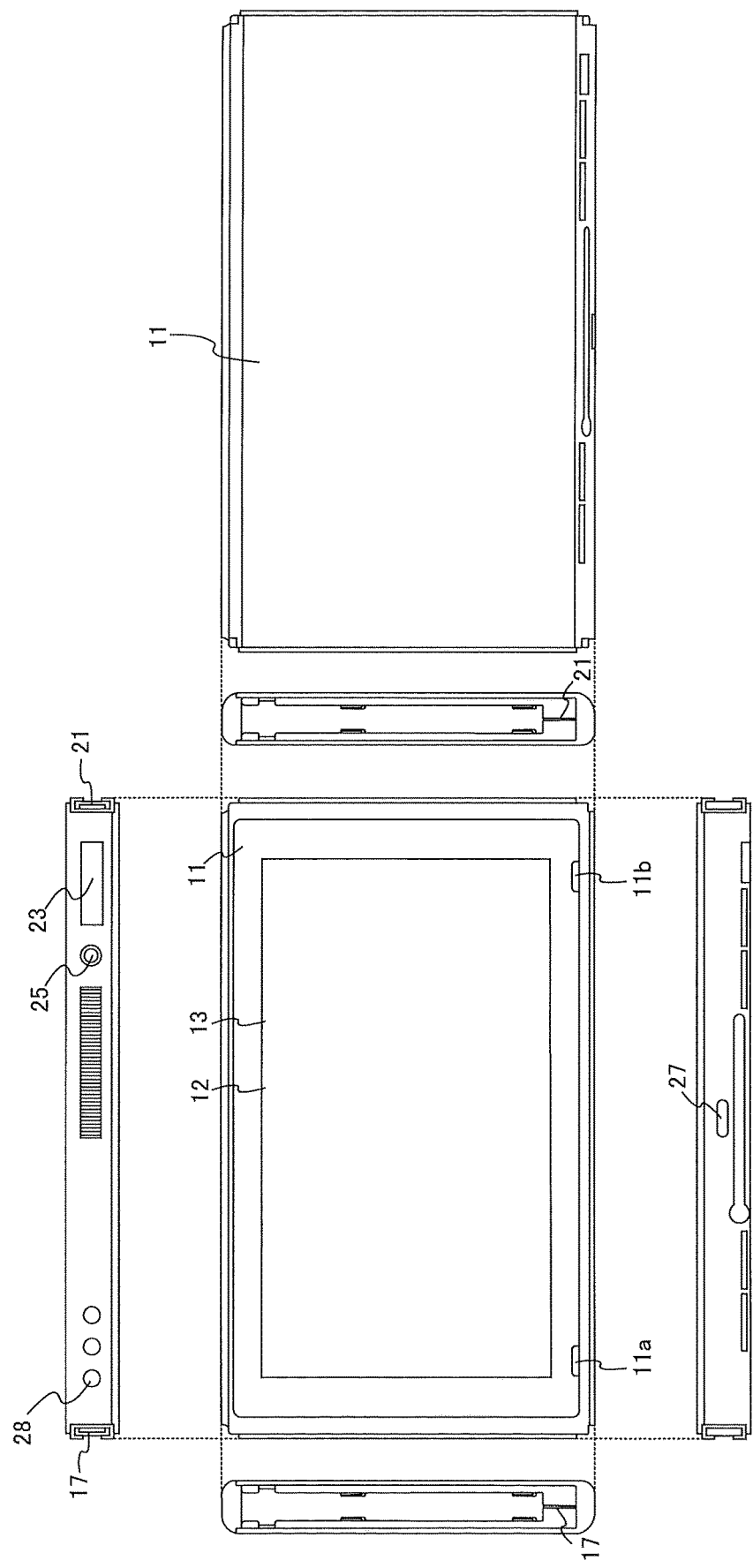
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

It should be noted that the shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single touch input (e.g., resistive film type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). When the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
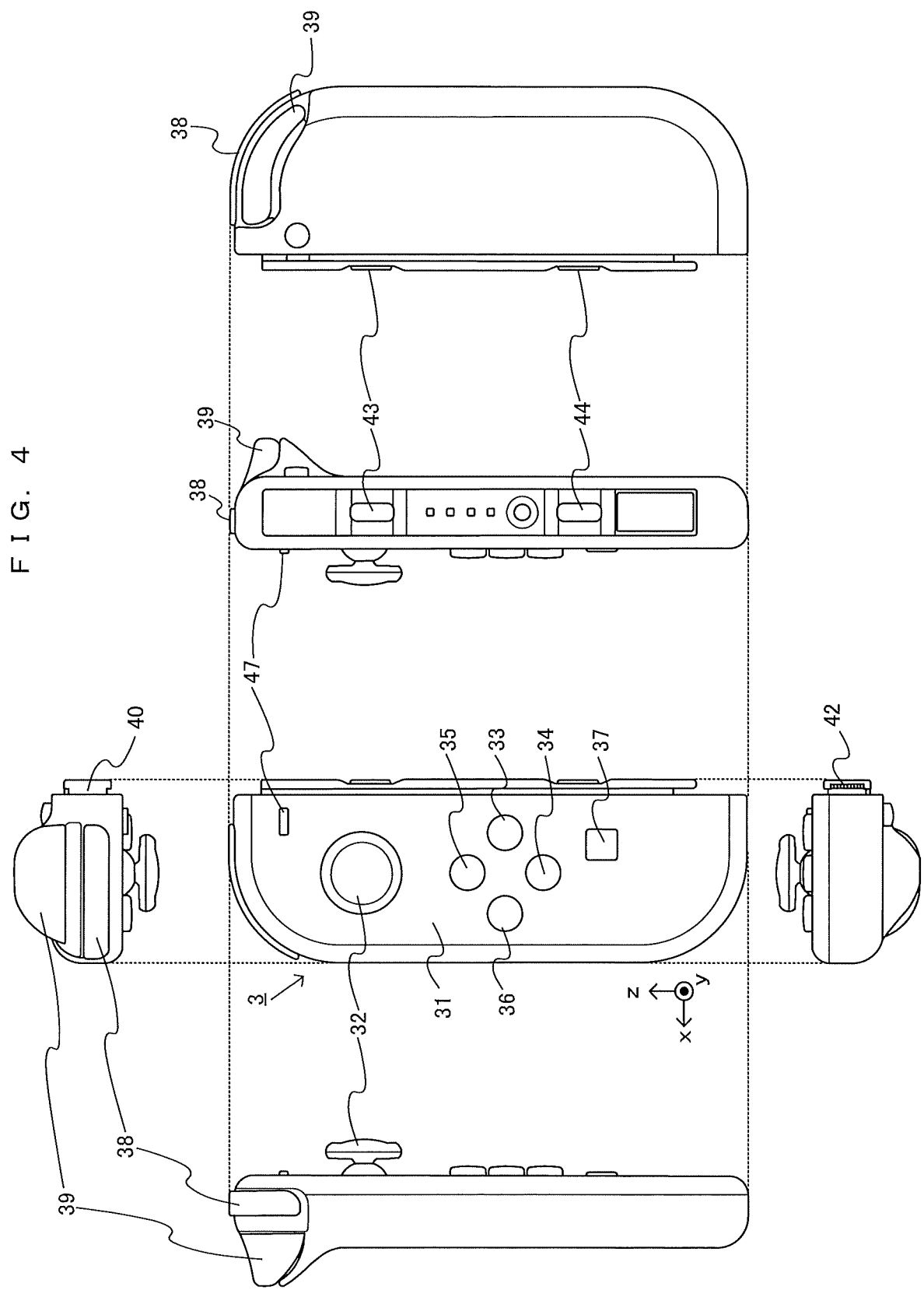
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (a z-axis direction shown in FIG. 4) in FIG. 4. In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32, which is an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
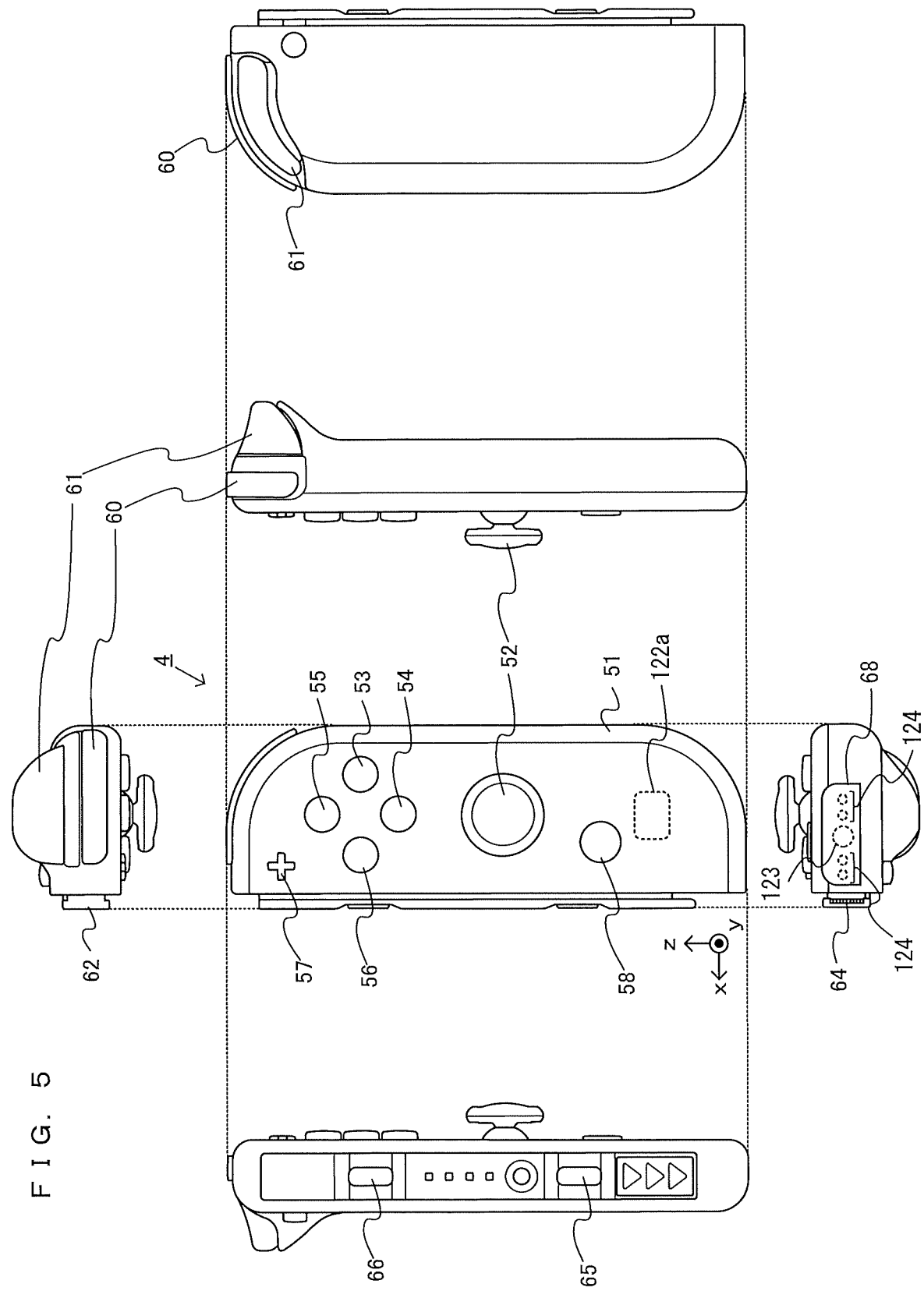
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction (the z-axis direction shown in FIG. 5) in FIG. 5. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly, the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
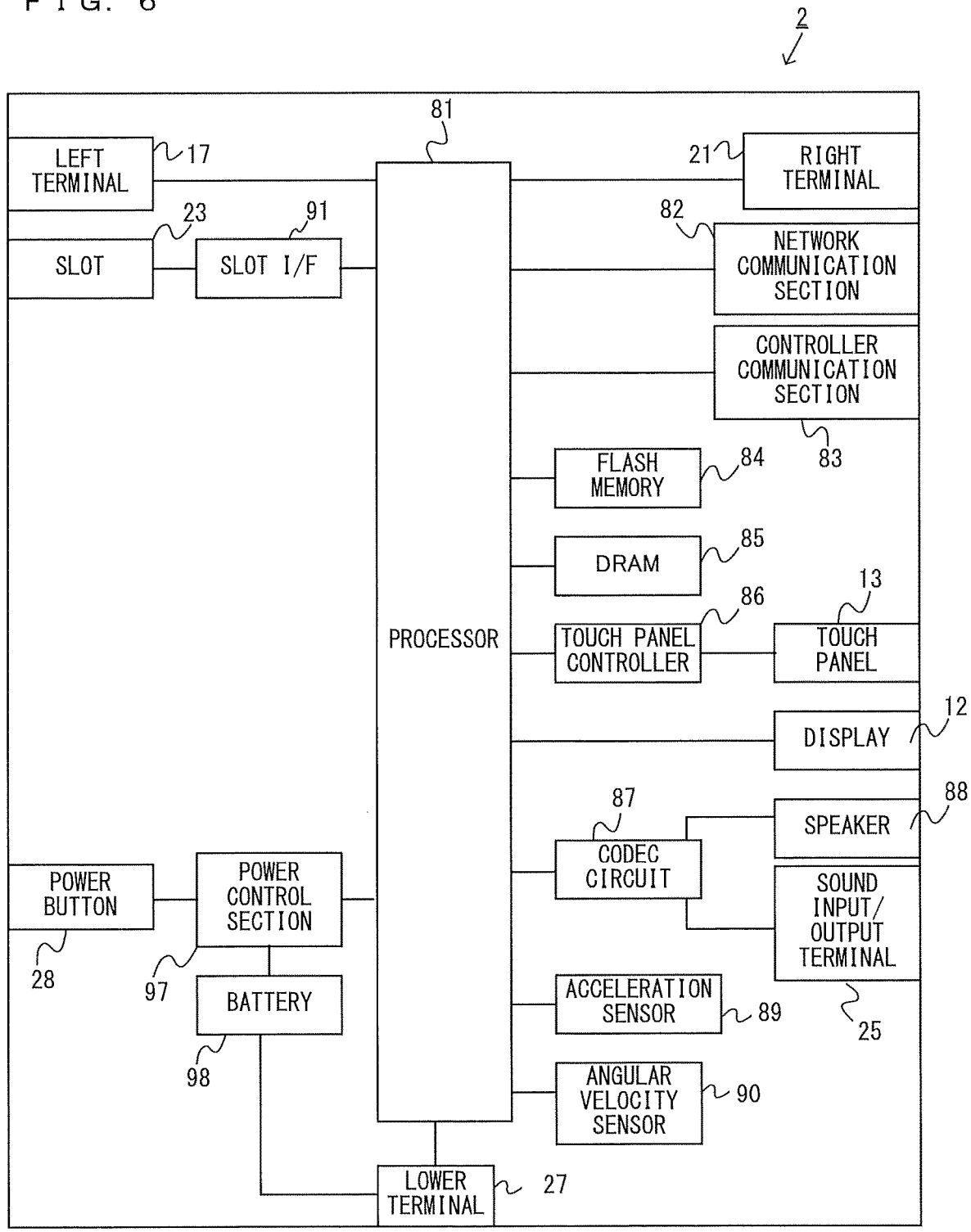
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
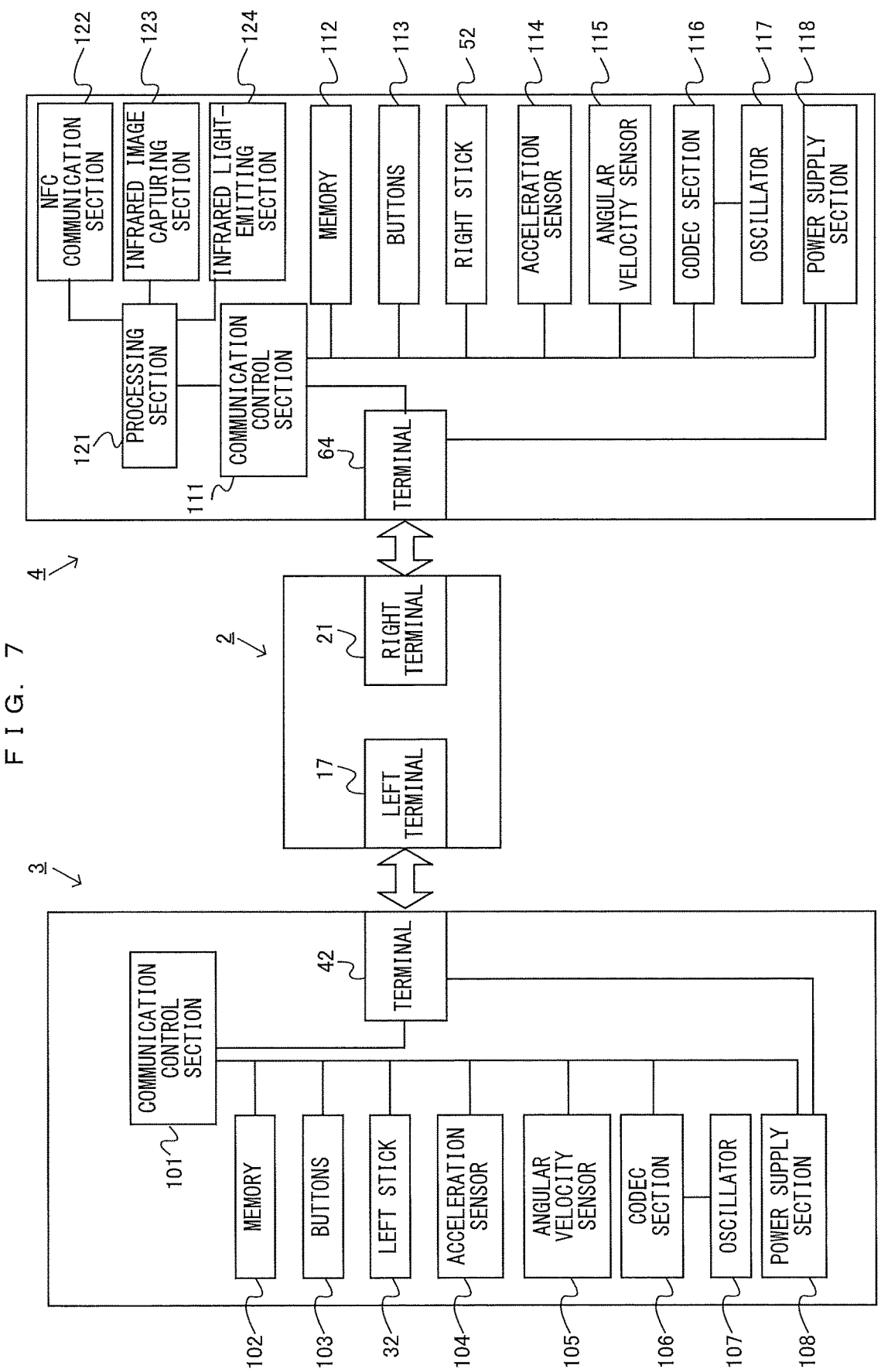
FIG. 7 is a block diagram showing a non-limiting example of the internal configuration of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation, or the detection result of the sensor) from each input section (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing of Exemplary Embodiment]

Next, an outline of operation of game processing executed by the game system 1 according to the exemplary embodiment will be described. As described above, in the game system 1, the left controller 3 and the right controller 4 are attachable to and detachable from the main body apparatus 2. When a game is played in a state where the left controller 3 and the right controller 4 are attached to the main body apparatus 2, the game image is outputted to the display 12. When the main body apparatus 2 alone in a state where the left controller 3 and the right controller 4 are detached from the main body apparatus 2 is attached to the cradle, the main body apparatus 2 can also output the game image to a stationary monitor or the like via the cradle. In the exemplary embodiment, an example case where game play is performed in the latter form will be described. Specifically, in this form, the main body apparatus 2 alone in a state where the left controller 3 and the right controller 4 are detached from the main body apparatus 2 is attached to the cradle, and the main body apparatus 2 outputs the game image and the like to a stationary monitor or the like via the cradle. In the description below, the left controller 3 or the right controller 4 may be simply referred to as a controller.

In the description below, unless otherwise specified, a case where a right-handed user plays a game while holding the right controller 4 in the right hand is assumed. In a case where the user is left-handed, the following processes as described below may be performed in a form in which the left controller 3 is used instead of the right controller 4.

[Assumed Game]

The game assumed in the exemplary embodiment is a badminton game played in a virtual three-dimensional space. In the exemplary embodiment, a case of a singles match against a CPU will be described as an example. As a matter of course, a player-against-player form in which another player operates a competing opponent may be adopted. In a case of a match between players, two players may play the match while using one game apparatus, or a communication match in which two game apparatuses are connected to each other via a network may be played. Further, the match need not necessarily be a singles match, and may be a doubles match.

Figure 8:
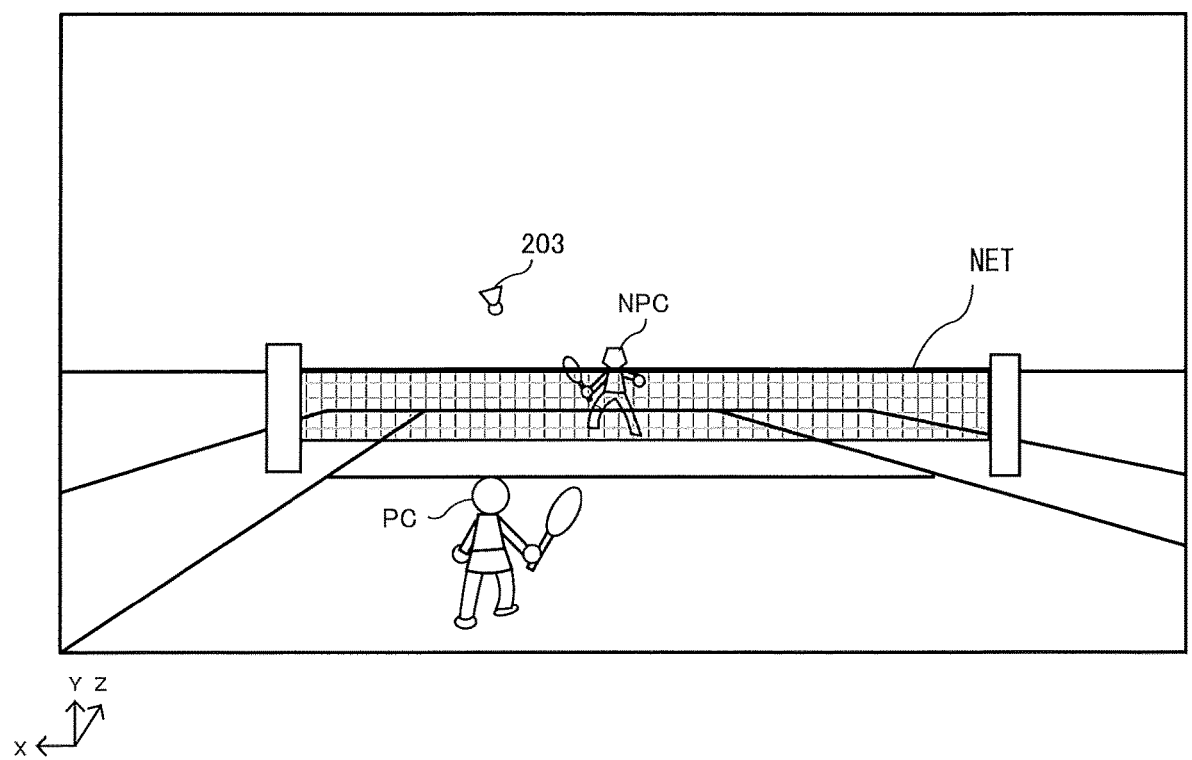
FIG. 8 is a non-limiting example of a game screen according to the exemplary embodiment.

FIG. 8 shows an example of a game image of a badminton game according to the exemplary embodiment. The game image shown in FIG. 8 is an image of a three-dimensional virtual space (virtual court) captured by a virtual camera. In the game image (in the virtual court), two athlete characters are displayed. In the court (own-side court) on the near side of the virtual court, a player character object (hereinafter, referred to as "player character") PC to be operated by the user is placed. In the court (opponent-side court) on the far side beyond a net, an athlete character (hereinafter, referred to as "opponent character") NPC to serve as a competing opponent is placed. Each athlete character holds a racket object (hereinafter, simply referred to as "racket") in the right hand. In addition, in the game image, a shuttle object (hereinafter, simply referred to as "shuttle") 203, which is a movement object, is also displayed.

A basic specification/operation method of a badminton game according to the exemplary embodiment will be described. First, in this game, the user swings (performs a swing input) a controller assumed as a racket, thereby being able to cause a player character PC to swing a racket. Here, in the exemplary embodiment, as the motion (hereinafter, racket swinging animation) of swinging the racket by the player character PC, basically, one of the following three types of motions is caused to be performed. That is, a racket swinging animation out of an overhead stroke (hereinafter, simply referred to as "Over"), a forehand underhand stroke (hereinafter, simply referred to as "Under-Fore"), and a backhand underhand stroke (hereinafter, simply referred to as "Under-Back") is caused to be performed.

Figure 9:
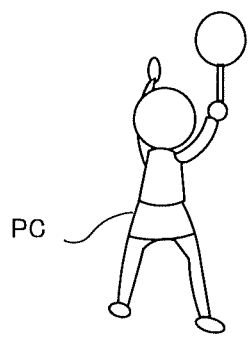
FIG. 9 is a non-limiting example of a motion of Over.
Figure 10:
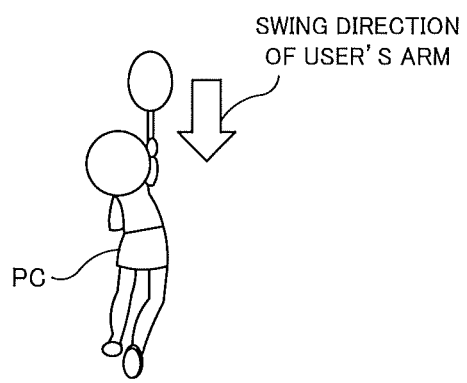
FIG. 10 is a non-limiting example of a motion of Over.
Figure 11:
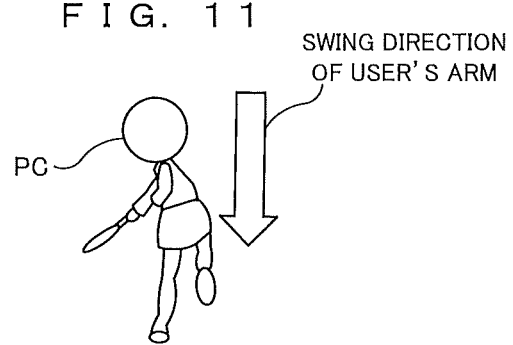
FIG. 11 is a non-limiting example of a motion of Over.

FIG. 9 to FIG. 15 show motion examples of the above three types of racket swinging animations performed by the player character PC. In these examples, the user is right-handed. FIG. 9 to FIG. 11 are each an example of a racket swinging animation of Over performed by the player character PC. As shown in these drawings, the player character PC performs a motion of swinging down the racket from above in a downward direction. In order to cause this motion to be performed, the user performs such a swing input as to swing down the controller (since this is an example of a right-handed case, the right controller 4, in this case) from above. That is, in order to cause the player character PC to perform a racket swinging animation of Over, the user is required to take an orientation of holding up the controller (corresponding to the state in FIG. 9), and then perform a swing input (swinging down) of swinging the controller in a downward direction (corresponding to the states in FIG. 10 to FIG. 11) viewed from the user.

Figure 12:
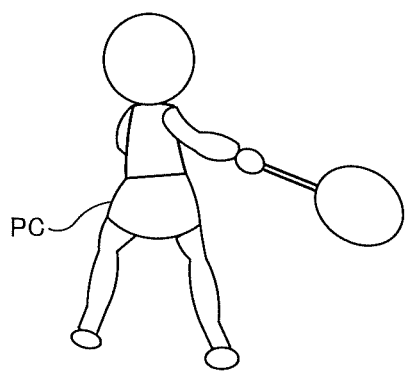
FIG. 12 is a non-limiting example of a motion of Under-Fore.
Figure 13:
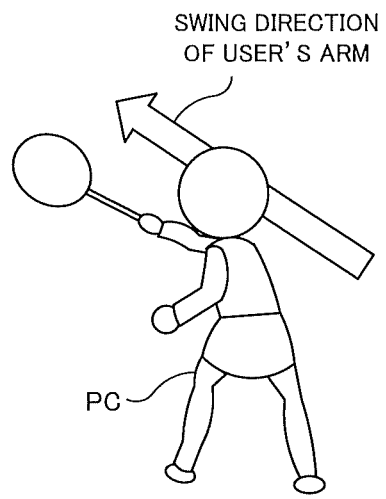
FIG. 13 is a non-limiting example of a motion of Under-Fore.

FIG. 12 to FIG. 13 are each an example of a racket swinging animation of Under-Fore performed by the player character PC. As shown in these drawings, the player character PC performs such a motion as to swing up the racket (from the right side of the player character PC) toward the upper left. In order to cause the player character PC to perform such a racket swinging animation of Under-Fore, the user is required to hold the controller at the right side of the user (corresponding to the state in FIG. 12), and then perform a swing input (swinging up in an upper left direction) of swinging the controller in an upper left direction (corresponding to the state in FIG. 13) viewed from the user.

Figure 14:
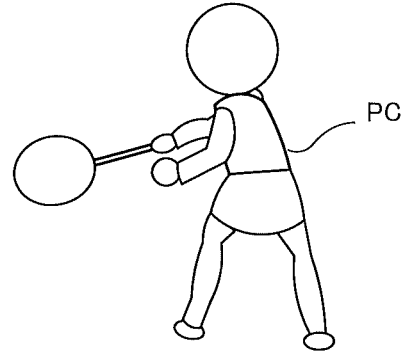
FIG. 14 is a non-limiting example of a motion of Under-Back.
Figure 15:
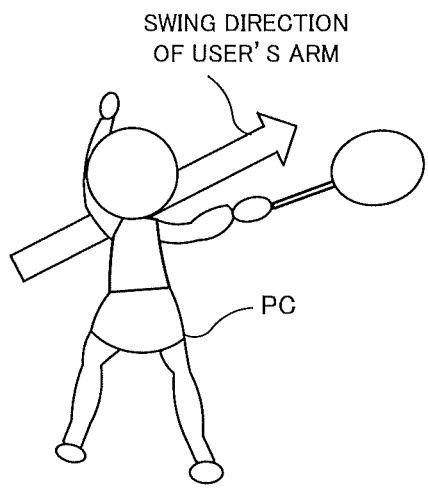
FIG. 15 is a non-limiting example of a motion of Under-Back.

FIG. 14 to FIG. 15 are each an example of a racket swinging animation of Under-Back performed by the player character PC. As shown in these drawings, the player character PC performs such a motion as to swing up the racket (from the left side of the player character PC) toward the upper right. In order to cause the player character PC to perform such a racket swinging animation of Under-Back, the user is required to hold the controller at the left side of the user (corresponding to the state in FIG. 14), and then perform a swing input (swinging up in an upper right direction) of swinging the controller in an upper right direction (corresponding to the state in FIG. 15) viewed from the user.

Next, movement of the player character PC will be described. In this game, movement of the player character PC is automatically controlled. Specifically, in accordance with a movement trajectory (movement direction) of the shuttle 203, the player character PC automatically moves (hereinafter this movement will be referred to as "automatic movement") in the own-side court toward a position where the player character PC can hit back the shuttle 203. For example, a case where, when the player character PC is positioned on the left side in the own-side court, the shuttle 203 moves toward the right side in the own-side court, is assumed. In this case, a position (e.g., an arbitrary position on the left side of the trajectory of the shuttle 203) at which the shuttle 203 can be hit back is calculated. Then, the player character PC is controlled so as to perform an automatic movement toward the calculated position (hereinafter, "automatic movement destination"). When the automatic movement destination is to be calculated, parameters such as a movement speed set to the player character PC, a movement direction and a movement speed of the shuttle 203, a position of the player character PC at a time point when the shuttle 203 starts movement, and the like may be used. When an automatic movement destination of the player character PC is to be calculated, with respect to which of the left side and the right side of the trajectory of the shuttle 203 is to be designated as the automatic movement destination, a position close to a center portion in the x-axis direction of the own-side court may be preferentially calculated as the automatic movement destination. For example, in a case where the position of the player character PC at the time point of start of movement of the shuttle 203 is close to the right end of the own-side court, and the shuttle 203 moves along a trajectory that passes through the left side of the current position of the player character PC, an arbitrary position on the left side of the trajectory of the shuttle 203 may be calculated as the automatic movement destination. Accordingly, the position of the player character PC can be controlled such that the player character PC is positioned so as to be close to the court center as much as possible. When there is no time for moving to a position on the court center side relative to the trajectory of movement of the shuttle 203, a position on a court end relative to the trajectory of movement of the shuttle 203 may be calculated as the automatic movement destination.

Thus, the badminton game in the exemplary embodiment is a game in which movement of the player character PC is performed as an automatic movement, and the user can concentrate on the swinging operation of the controller. That is, in this game, while estimating the timing at which the shuttle 203 arrives, the user is allowed to determine an appropriate way of swinging (swing direction in which the shuttle 203 can be hit back) out of the above three types of ways of swinging (swing directions), and swing the controller.

Next, a detection method of a swing input in the exemplary embodiment will be described. In the exemplary embodiment, the controller transmits operation data including outputs of the inertial sensors to the main body apparatus 2 according to the above-described method. Then, when the operation data satisfies a condition regarding the swing input, it is determined that the swing input has been performed on the controller. The condition regarding the swing input may be set as appropriate. For example, in the exemplary embodiment, with respect to the operation data, when the magnitude of an acceleration with respect to a predetermined axis of an inertial sensor exceeds a threshold, it may be determined that a swing input on the controller has been performed. Then, when it has been determined that a swing input on the controller has been performed, the main body apparatus 2 performs a process of determining what way of swinging has been performed, i.e., which direction the swing direction has been, through the process described below.

Figure 16:
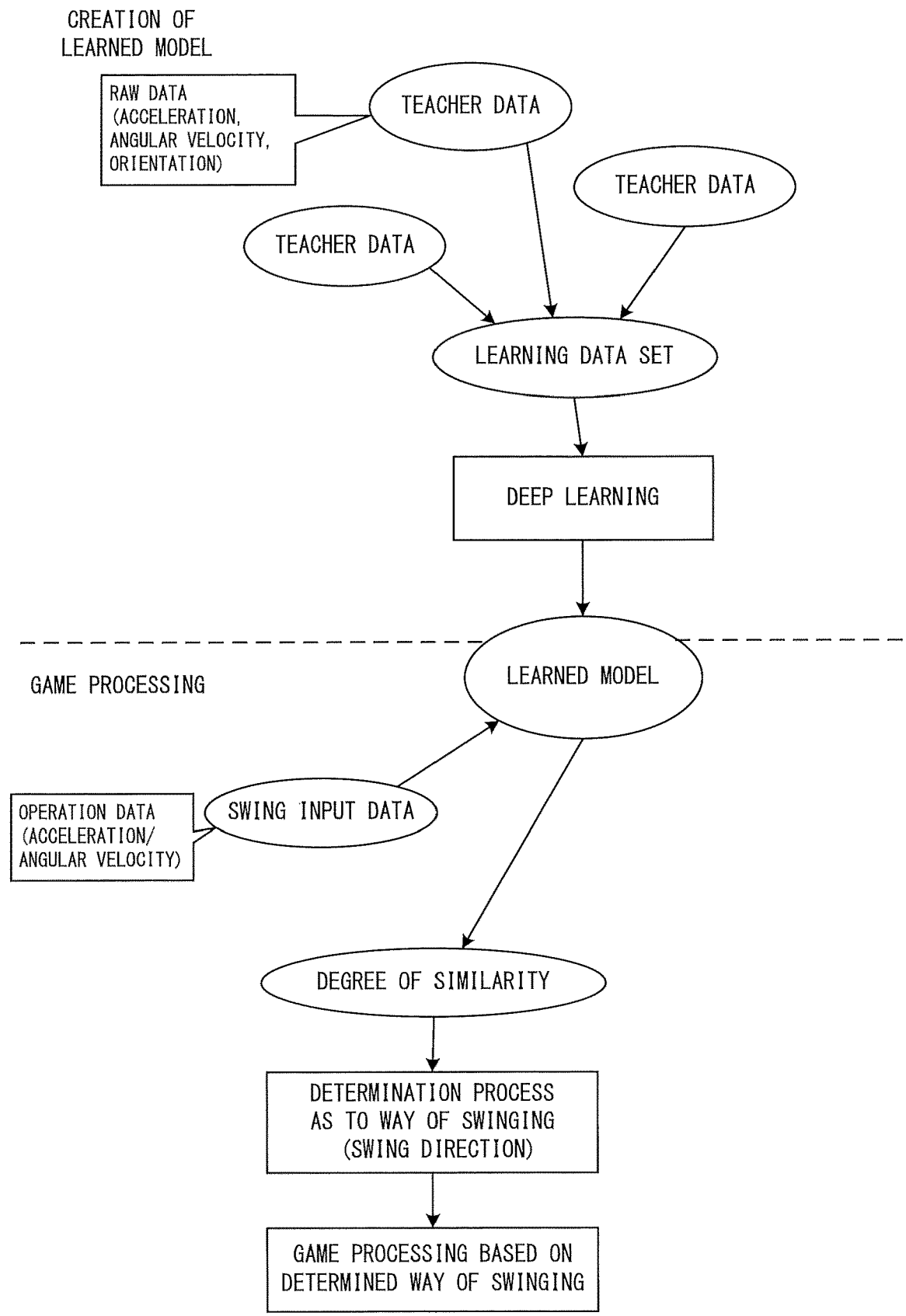
FIG. 16 is a non-limiting example of a diagram for describing an outline of a process according to the exemplary embodiment.

Next, an outline of a process regarding determination of the way of swinging (swing direction) of the controller performed in the badminton game of the exemplary embodiment will be described. FIG. 16 shows an outline of a method for determining a swing direction in the exemplary embodiment, and badminton game processing using the result. In the exemplary embodiment, in order to determine a swing input performed by the user, a learned model generated by using deep learning is used. An upper half of FIG. 16 shows a generation process of a learned model. A lower half of FIG. 16 shows an outline of badminton game processing according to the exemplary embodiment using the learned model.

[Learning Process]

First, generation (learning process) of the above learned model is briefly described. In the exemplary embodiment, a plurality of data sets (hereinafter, referred to as "teacher data") each being a set of: raw data obtained through a swing input of the controller; and a label indicating a way of swinging are prepared to be used as a learning data set. Specifically, as raw data, a data set composed of: acceleration data and angular velocity data progressively acquired in a period in which a single swing input is being performed; and orientation data of the controller is used (the orientation data is calculated on the basis of the acceleration/angular velocity). Then, to each raw data, a label indicating the way of swinging at that time is provided. As the label, a label indicating one of the three types of ways of swinging, i.e., Over (swinging down in a downward direction), Under-Fore (swinging up in an upper left direction), and Under-Back (swinging up in an upper right direction) as described above, is used. For each way of swinging, (as an example), about 5000 pieces of teacher data are prepared. The learning data set composed of a set of pieces of teacher data is subjected to deep learning, whereby a learned model is generated. The learned model may be, for example, an inference program in which learned parameters adjusted through the deep learning are incorporated.

Next, an outline of the badminton game processing of the exemplary embodiment using the learned model will be briefly described.

[Calculation of Degree of Similarity]

In this game processing, first, a degree of similarity is calculated by using swing input data according to a single swing input by the user, and the learned model regarding the three types of ways of swinging. The swing input data includes operation data (acceleration/angular velocity data), and orientation data of the controller calculated from the operation data. The swing input data is inputted to the learned model, whereby a degree of similarity with respect to each of the three types of ways of swinging is calculated (inference process) as an output result from the learned model. In the exemplary embodiment, an example in which the value of the degree of similarity is calculated in a range of −50 to +50 will be described. As for the value, using 0 as a reference, the greater the value of "+" is, the higher the degree of similarity is, and the greater the value of "−" is, the lower the degree of similarity is. For example, when certain swing input data is inputted to the learned model, a content such as "Over: +10, Under-Fore: −10, Under-Back: −20" is outputted from the learned model.

Here, calculation (determination of similarity) of the degree of similarity is supplementarily described. As described above, in the exemplary embodiment, acceleration data and angular velocity data progressively acquired in a period in which a swing input is being performed, and orientation data of the controller are used as teacher data. Therefore, in the exemplary embodiment, it can be said that the degree of similarity is calculated on the basis of transition of change in the acceleration, the angular velocity, and the orientation of the controller in the period in which a swing input is being performed. That is, in a period from the start to the end of a swing input by the user, a data set composed of an acceleration, an angular velocity, and an orientation of the controller is obtained every predetermined unit time (e.g., one frame). Then, similarity between these data sets obtained in this period, and the learning data set (in which a data form similar to that of these data sets is used) is determined. Not the similarity of a data set according to a single frame but the similarity between the learning data set and a data set of each of a plurality of frames from the start to the end of the swing input is determined.

Figure 17:
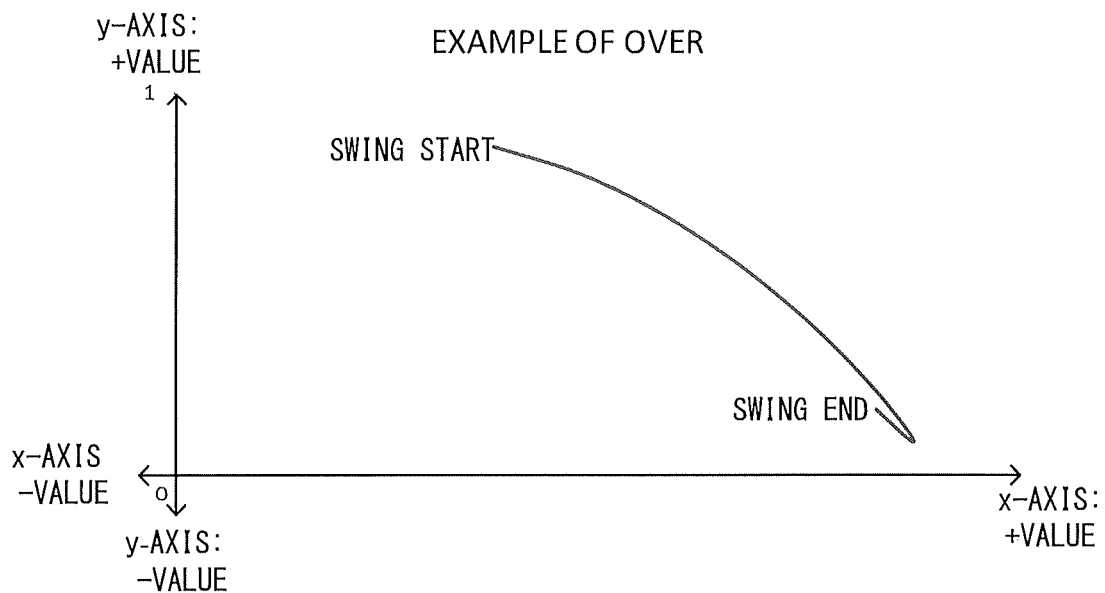
FIG. 17 is a non-limiting example of a waveform representing change in the orientation of a controller in a case of Over.
Figure 18:
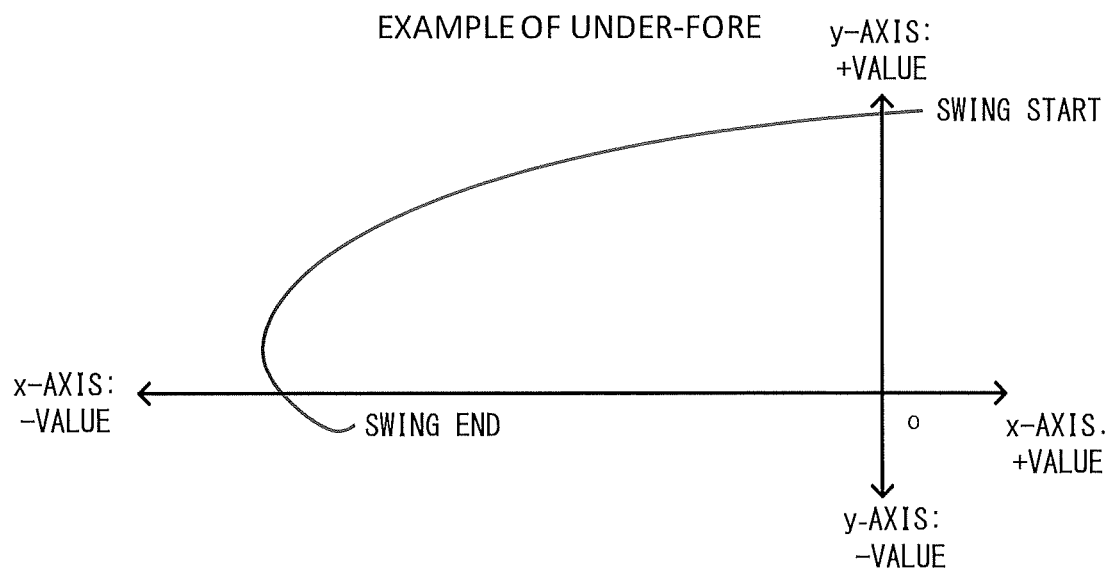
FIG. 18 is a non-limiting example of a waveform representing change in the orientation of the controller in a case of Under-Fore.
Figure 19:
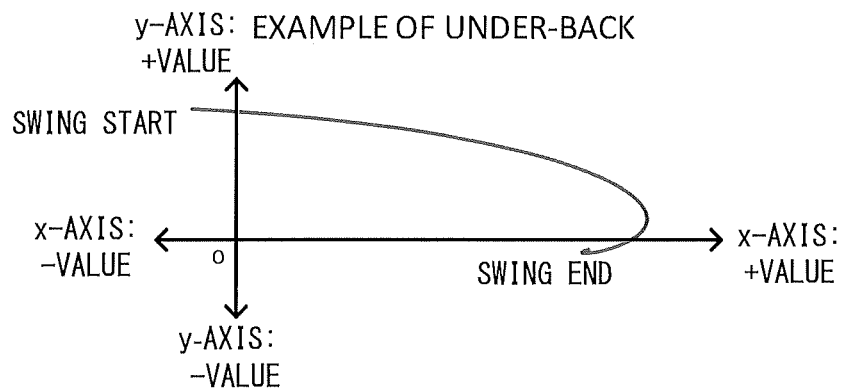
FIG. 19 is a non-limiting example of a waveform representing change in the orientation of the controller in a case of Under-Back.

As a conceptual example of the similarity determination method in the exemplary embodiment, an example focusing on a value that indicates transition of coordinates of the controller in a predetermined coordinate system and that is calculated on the basis of the acceleration/angular velocity of the controller will be described. In the exemplary embodiment, out of coordinates of the controller in a three-dimensional coordinate system set when the controller is at a reference orientation, change in the coordinates in the xyaxes from the swing start to the swing end of the controller is focused on. FIGS. 17 to 19 are waveforms (graphs) showing examples of transition of coordinates of the controller in a predetermined coordinate system, according to the three types of ways of swinging. On the basis of (orientation data included in) the above swing input data according to a single swing input, these waveforms can be derived as transition of coordinates of the controller with respect to the x-axis and y-axis in a predetermined coordinate system. FIG. 17 shows a waveform in a case of Over, FIG. 18 shows a waveform in a case of Under-Fore, and FIG. 19 shows a waveform in a case of Under-Back. In each waveform, the horizontal axis corresponds to the x-axis in the predetermined coordinate system, and the vertical axis corresponds to the y-axis. There are individual differences in the swinging motion, and the change in the coordinate in a predetermined coordinate axis of the controller shown in each of FIGS. 17 to 19 is merely an example. Thus, there are differences in obtained values depending on differences in the way of swinging, and it is shown that the waveforms derived from these values are also different from each other.

Other than this, although not shown, also with respect to the coordinate in the z-axis of the controller in the predetermined coordinate system, values indicating the transition of the coordinate are derived. Therefore, such values may be used in the similarity determination. As another example, with respect to not the values indicating the coordinates of the controller in the predetermined coordinate system, but change in the acceleration or the angular velocity as well, values that indicate transition of change in the acceleration or the angular velocity can be derived for each axis. Therefore, such values may be used in the similarity determination. Such values are included in each of the learning data set (each teacher data) and the swing input data. In the exemplary embodiment, the way of swinging of the controller is determined by using the fact that there are differences in the obtained values due to differences in the way of swinging. The learning data set (each teacher data) to be used in the exemplary embodiment is prepared by providing a label indicating a swing direction, to raw data obtained by actually swinging the controller in advance. Then, swing input data based on a swinging operation of the user during an actual game is inputted to the learned model generated by using thus-prepared learning data set, whereby the degree of similarity between each of the three types of ways of swinging and the swinging operation of this time is calculated and outputted. Then, the way of swinging that has the highest degree of similarity is determined as the swinging operation of this time.

In the exemplary embodiment, an example in which, as the teacher data, each data of the acceleration, the angular velocity, and the orientation (of the controller) is used is shown. However, in another exemplary embodiment, the orientation data need not necessarily be included in the teacher data. That is, in the similarity determination, only the acceleration/angular velocity may be used without using the orientation data. However, when the orientation data is used in the similarity determination as in the exemplary embodiment, improvement of determination accuracy can be expected.

[Determination as to Way of Swinging (Swing Direction) to be Used in Game Processing]

After the degree of similarity of each of the three types of ways of swinging has been obtained as described above, a way of swinging that has a degree of similarity being equal to or greater than a predetermined threshold (e.g., +1) is selected out of these three degrees of similarity, whereby the way of swinging according to the swing input by the user is determined. When there are two or more ways of swinging that have a degree of similarity being equal to or greater than the predetermined threshold, a way of swinging that has the highest degree of similarity is selected therefrom. Then, if it can be determined which of the three types of ways of swinging the way of swinging is, it can be considered that the controller has been swung in the swing direction corresponding to the way of swinging. That is, it is determined that, out of these three types of ways of swinging, a way of swinging that has the highest degree of similarity has been performed, and the subsequent game processing is performed.

[Game Processing Based on Way of Swinging]

Next, game processing based on the above determined way of swinging (swing direction) is performed. Specifically, on the basis of the way of swinging, and the positional relationship (in other words, the timing of swinging the controller) between the player character PC and the shuttle 203, whether or not the shuttle 203 can be hit back is determined. Then, when it has been determined that the shuttle 203 can be hit back, a process in which a racket swinging animation corresponding to the way of swinging (swing direction) is reproduced and the shuttle 203 is hit back (moved) to the opponent's court, is performed.

Here, the positional relationship between the shuttle 203 and the player character PC in which the shuttle 203 can be hit back is supplementarily described. In the exemplary embodiment, in accordance with each of the three types of ways of swinging, a three-dimensional region in which the shuttle 203 can be hit back is set in advance. In the description below, a region in which hitting back (Over shot) by Over is allowed will be referred to as "Over-allowed region", a region in which hitting back (Under-Fore shot) by Under-Fore will be referred to as "Under-Fore-allowed region", and a region in which hitting back (Under-Back shot) by Under-Back will be referred to as "Under-Back-allowed region". Further, these three regions will also be collectively referred to as "shot-allowed region".

Figure 20:
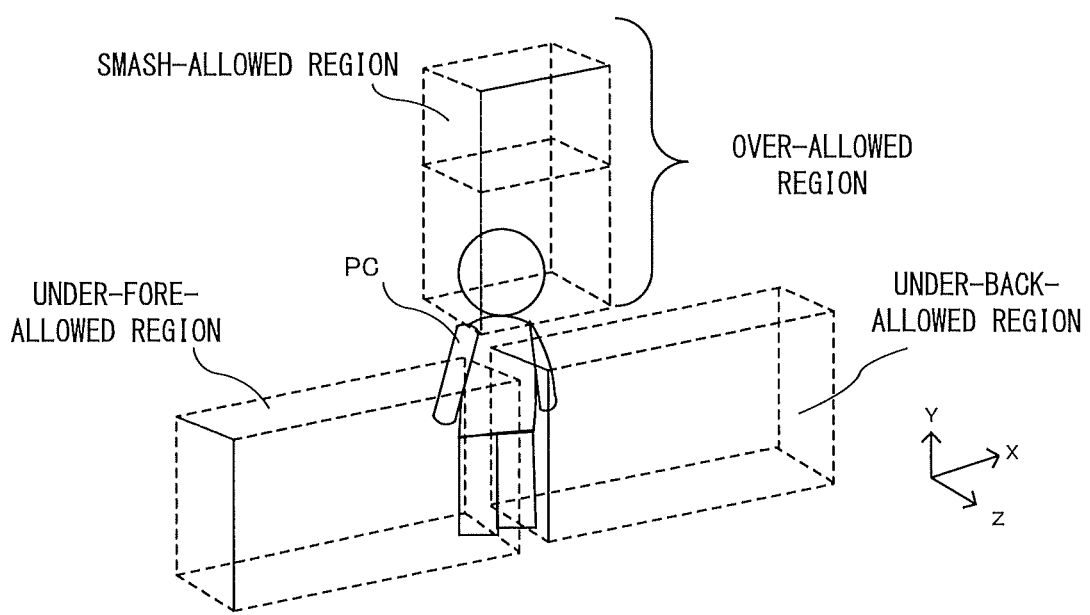
FIG. 20 is a non-limiting example of a shot-allowed region.

FIG. 20 shows an example of setting of the shot-allowed region. The shot-allowed region is provided to a position in the vicinity of the front of the player character PC. Each region will be described. First, the Over-allowed region is a region that is positioned forward of the head of the player character PC and that has a vertically long shape extending in the upward direction. The Under-Fore-allowed region is, when viewed from the player character PC, a region that is below almost the position of the chest, and that has a horizontally long shape extending from the center of the player character PC toward the right side. The Under-Back-allowed region is, when viewed from the player character PC, a region that is below almost the position of the chest, and that has a horizontally long shape extending from the center of the player character PC toward the left side. Then, at a timing when the shuttle 203 is in one of these regions, if a way of swinging corresponding to the region is performed, the shuttle 203 can be hit back. The shape/position/size of each region is merely an example, and the shape of the region may be spherical, for example.

[Miss Shot]

Here, in the exemplary embodiment, when a swing input is performed while the shuttle 203 is not in the shot-allowed region, the swing input is regarded as a "swing and miss" in principle. That is, a racket swinging animation corresponding to the way of swinging determined by using the learned model is merely reproduced. However, as an exception, in the exemplary embodiment, a process of causing a "miss shot" to occur is also performed under a predetermined condition. Specifically, in a situation where the shuttle 203 should be hit back by Under-Fore or Under-Back, when a way of swinging corresponding to Over is performed, this swinging becomes a "miss shot". The situation where the shuttle 203 should be hit back by Under-Fore or Under-Back is a timing at which the shuttle 203 is in the Under-Fore-allowed region or the Under-Back-allowed region. In this case, a racket swinging animation of "miss shot" is reproduced, and the shuttle 203 can be hit back (to some extent). However, when the shuttle 203 has been hit back by a miss shot, adjustment of extremely reducing the movement speed of the hit back shuttle 203 (making the motion weak) is also performed. That is, when the shuttle 203 is hit back by a miss shot, the shuttle 203 enters a state of reduced power, and thus, a situation where the opponent can easily assume the timing of hitting back (a disadvantageous situation for the user) is established. In another example, when a swing input has been performed while the shuttle 203 is not in the shot-allowed region, a racket swinging animation corresponding to the determined way of swinging need not necessarily be reproduced.

It should be noted that, when a way of swinging corresponding to Under-Fore or Under-Back is performed in a situation where the shuttle 203 should be hit back by Over, the swinging becomes a "swing and miss".

[Smash]

Further, in the exemplary embodiment, when a way of swinging corresponding to Over has been performed while: the shuttle 203 is in the Over-allowed region; and, further, the height of the shuttle is equal to or greater than a certain height, a process of causing a "smash" to occur is also performed. For example, as shown in FIG. 20, substantially an upper half of the Over-allowed region is also defined as a "smash-allowed region". Then, when a way of swinging corresponding to Over is performed while the shuttle 203 is in the "smash-allowed region", a "smash" occurs. In this case, a smash-dedicated racket swinging animation that is slightly different from the racket swinging animation of Over is reproduced, and the movement speed of the hit back shuttle 203 is also controlled so as to move at a higher speed than when the back shuttle 203 is hit back by Over.

[Speed Reduction Adjustment Performed when the Shuttle is Close to the Ground]

In the exemplary embodiment, in addition to the process relating to swing determination as described above, when the shuttle 203 is at a position close to the ground of the virtual court (when the shuttle 203 is at a height equal to or less than a predetermined threshold from the ground), a process of reducing the movement speed of the shuttle 203 at a proportion corresponding to the height from the ground is also performed. For example, the following control is also performed. That is, in terms of the height in the virtual space, when the shuttle 203 is at a height equal to or less than 40 cm from the ground, the movement speed of the shuttle 203 is reduced to 90% of the original, in a range of less than 40 cm and equal to or greater than 30 cm; the movement speed of the shuttle 203 is reduced to 75% of the original, in a range of less than 30 cm and equal to or greater than 20 cm; the movement speed of the shuttle 203 is reduced to 60% of the original, in a range of less than 20 cm and equal to or greater than 10 cm; and the movement speed of the shuttle 203 is reduced to 50% of the original, in a range of less than 10 cm. When the movement speed is temporarily reduced when the shuttle 203 is close to the ground to some extent, a time for performing a swing input corresponding to Under-Fore or Under-Back in particular, can be provided to the user. Although a process of the badminton game is performed in the exemplary embodiment, the center of gravity of a badminton shuttle, in reality, is considered to be biased to the cork portion due to the shape of the shuttle. Therefore, when the motion of the shuttle 203 is controlled through physical calculation in the game processing, the falling speed (acceleration) of the shuttle 203 increases when the shuttle 203 comes close to the ground, and accordingly, the user may have difficulty in assuming the timing. As a result, the possibility that the user fails to perform a swing input of Under-Fore or Under-Back in time may be increased. Therefore, when the speed reduction adjustment as described above is performed, a time for allowing the user to perform a swing input can be provided to the user. This is a control that is useful in a badminton game in particular.

[Details of Badminton Game Processing of the Exemplary Embodiment]

Next, with reference to FIG. 21 to FIG. 31, the badminton game processing in the exemplary embodiment will be described in more detail.

[Data to be Used]

Figure 21:
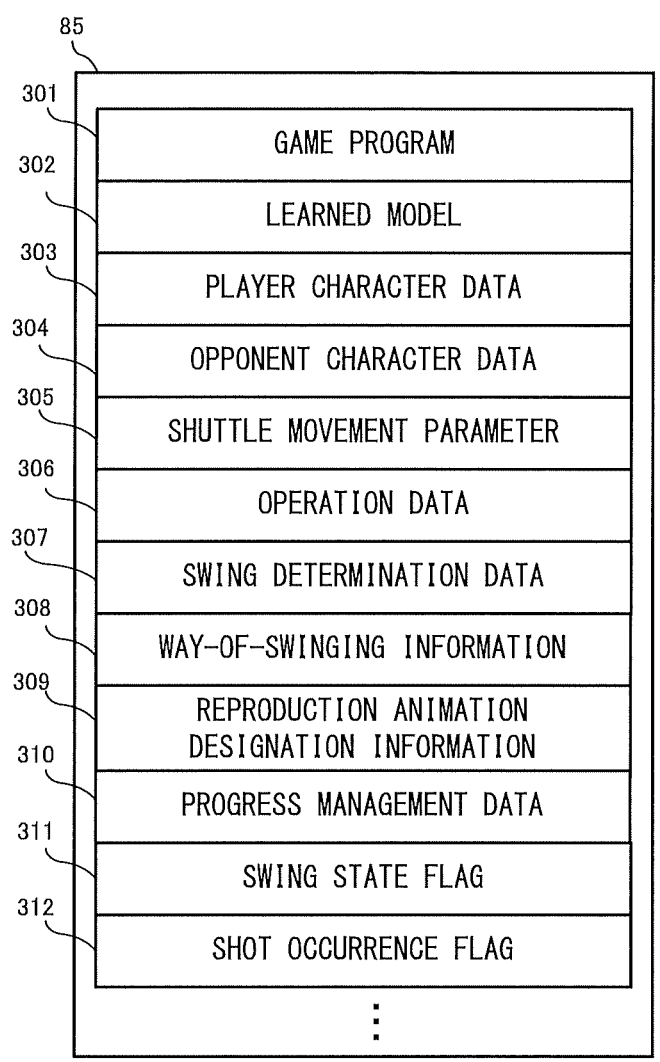
FIG. 21 is a memory map showing a non-limiting example of various types of data stored in a DRAM 85.

First, various types of data used in the badminton game processing will be described. FIG. 21 is a memory map showing an example of various types of data stored in the DRAM 85 of the main body apparatus 2. The DRAM 85 of the main body apparatus 2 has stored therein a game program 301, a learned model 302, player character data 303, opponent character data 304, a shuttle movement parameter 305, operation data 306, swing determination data 307, way-of-swinging information 308, reproduction animation designation information 309, progress management data 310, a swing state flag 311, a shot occurrence flag 312, and the like.

The game program 301 is a program for executing the badminton game processing in the exemplary embodiment.

The learned model 302 is a learned model generated through the above-described deep learning and stored. In the exemplary embodiment, as for the learned model 302, a learned model incorporated as a part (as game data) of a game application is loaded to the DRAM 85 and used, for example. That is, a learned model prepared in advance is used. In another exemplary embodiment, for example, at a predetermined timing such as the time of game start, a learned model may be downloaded to be acquired from a predetermined server.

Figure 22:
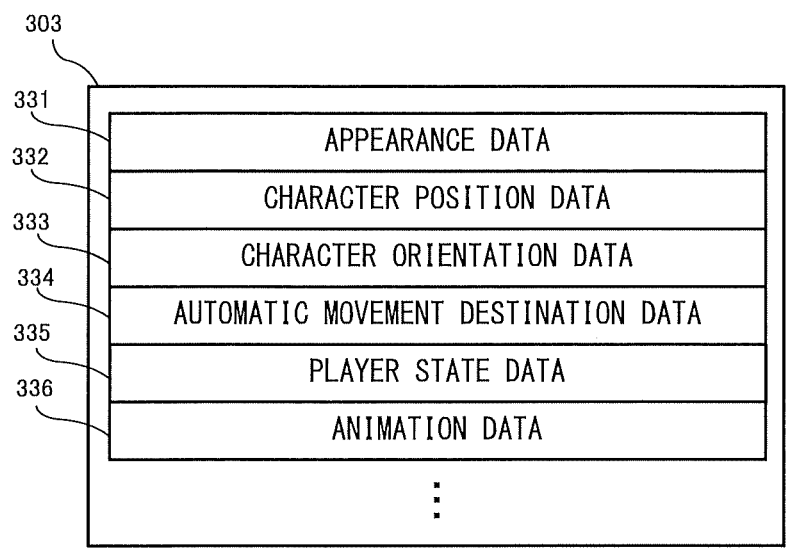
FIG. 22 is a non-limiting example of player character data 303.

The player character data 303 is data regarding the player character PC. FIG. 22 shows an example of a data configuration of the player character data 303. The player character data 303 includes appearance data 331, character position data 332, character orientation data 333, automatic movement destination data 334, player state data 335, animation data 336, and the like.

The appearance data 331 is data for forming an appearance of the player character PC. The appearance data 331 includes modeling data of a three-dimensional model of the player character PC, texture data, and the like, for example.

The character position data 332 is coordinate data for indicating the current position of the player character PC. The character orientation data 333 is data indicating the current orientation (which direction the player character PC is facing, and the like) of the player character PC.

The automatic movement destination data 334 is coordinate data indicating the position of the above-described automatic movement destination.

The player state data 335 is data for managing the current state (hereinafter, player state) of the player character PC. In the exemplary embodiment, as the player state, states shown below are used. In the player state data 335, information indicating one of the player states below is set.

"Moving": a state where the player character PC is moving toward an automatic movement destination.

"Over": a state where the player character PC is performing a motion of Over.

"Smash": a state where the player character PC is performing a motion of smash.

"Under-Fore": a state where the player character PC is performing a motion of Under-Fore.

"Under-Back": a state where the player character PC is performing a motion of Under-Back.

"Miss shot": a state where the player character PC is performing a motion of a miss shot.

"Standby": a state not being any of the above.

The animation data 336 is data of animations corresponding to various types of motions of the player character PC. The animation data 336 includes data of the above racket swinging animations (including animations of a miss shot and a smash), an animation to be displayed at the time of "standby", and an animation to be displayed during automatic movement.

Regarding the animation data 336, as a racket swinging animation corresponding to a single way of swinging, data of a plurality of animations may be prepared. These plurality of animations may be prepared in accordance with the height of the shuttle 203. For example, as data of animation corresponding to "Over", a plurality of animations corresponding to the height of the shuttle 203 may be prepared. Then, an animation of "Over" corresponding to the height of the shuttle 203 at the time when a swing input of Over has been performed may be selected, and this animation may be reproduced.

With reference back to FIG. 21, the opponent character data 304 is data regarding the above-mentioned opponent character NPC. A content similar to that of the player character data 303 is stored.

The shuttle movement parameter 305 is data for performing movement control of the shuttle 203. The shuttle movement parameter 305 includes various parameters indicating, for example, the current position, the movement trajectory, and the movement speed of the shuttle 203, and the current state (e.g., whether or not the shuttle 203 has been a miss shot) of the shuttle 203.

Figure 23:
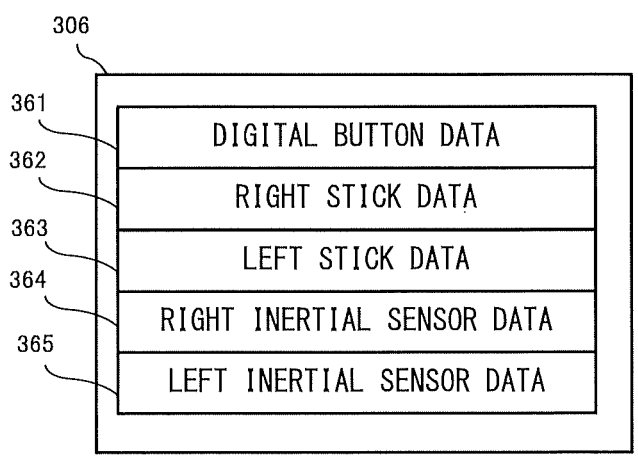
FIG. 23 is a non-limiting example of operation data 306.

The operation data 306 is data obtained from the controller, and is data indicating the content of operations performed by the user. FIG. 23 shows an example of a data configuration of the operation data 306. The operation data 306 includes at least digital button data 361, right stick data 362, left stick data 363, right inertial sensor data 364, and left inertial sensor data 365. The digital button data 361 is data indicating the press state of various types of buttons of the controller. The right stick data 362 is data for indicating the content of an operation performed onto the right stick 52. Specifically, two-dimensional (x, y) data is included. The left stick data 363 is data for indicating the content of an operation performed onto the left stick 32. The right inertial sensor data 364 is data indicating detection results of inertial sensors, i.e., the acceleration sensor 114 and the angular velocity sensor 115, of the right controller 4. Specifically, three axial acceleration data and three axial angular velocity data are included. The left inertial sensor data 365 is data indicating detection results of inertial sensors, i.e., the acceleration sensor 104 and the angular velocity sensor 105, of the left controller 3. In the description below, the right inertial sensor data 364 and the left inertial sensor data 365 may be collectively referred to as inertial sensor data.

With reference back to FIG. 21, the swing determination data 307 is data for determining whether or not a swing input has been performed, and is also data indicating the content of a swing input (in a period in which the swing input is being performed). Specifically, the swing determination data 307 is a buffer that can accumulate acceleration data and angular velocity data obtained from the respective inertial sensors and orientation data of the controller calculated based on these data, of a predetermined period (e.g., several tens of frames). The orientation data may be data represented by three axial (x, y, z) vectors in a local coordinate system of the controller, for example. In the exemplary embodiment, with use of the swing determination data 307, detection of a swing input as described above, and a determination process as to the way of swinging using the learned model are performed.

The way-of-swinging information 308 is information indicating the way of swinging (swing direction) of the controller, obtained as a determination result of the way of swinging using the learned model. That is, the way-of-swinging information 308 is information indicating a way of swinging that has been determined as most similar among the three types of ways of swinging. In the exemplary embodiment, information indicating one of "Over", "Under-Fore", "Under-Back", and "not applicable" is set. Further, the way-of-swinging information 308 can be set to be information indicating the swing direction. As described above, in the exemplary embodiment, "Over" corresponds to a swing in a downward direction, "Under-Fore" corresponds to a swing in an upper left direction, and "Under-Back" corresponds to a swing in an upper right direction (all in the case of a right-handed user). Therefore, it can be said that, when the way of swinging can be determined, the swing direction is also naturally determined.

The reproduction animation designation information 309 is information that designates an animation to be reproduced for the player character PC.

The progress management data 310 is data for managing the progress of a match. Specifically, a service flag indicating whether or not the aspect is an aspect in which a service is performed, and data such as score information indicating a point status are included.

The swing state flag 311 is a flag for indicating whether or not the controller is in a "swing state", which is a state where the controller is being swung. The initial value is OFF, and ON is set when the controller is in a swing state.

The shot occurrence flag 312 is a flag for indicating whether or not, as a result of a swing input performed by the user, the state is a state where hitting back (shot) of the shuttle 203 is to occur. The initial value is OFF, and ON is set when the state is a state where a shot is to occur.

Other than these, various types of data necessary for the game processing are also generated as appropriate to be stored in the DRAM 85.

[Details of Process Executed by Processor 81]

Next, details of the badminton game processing according to the exemplary embodiment will be described. It should be noted that flowcharts described below are merely examples of the flows of processes. Therefore, as long as a similar result can be obtained, the processing order of steps may be changed. In addition, values of variables and thresholds used in a determination step are also merely examples, and other values may be adopted as necessary.

FIG. 24 is a flowchart showing details of the badminton game processing. When the user performs a predetermined operation for starting a match, execution of the process is started. The process loop of steps S2 to S3 in the flowchart is repeatedly executed for each frame.

First, in step S1, the processor 81 executes a preparation process for preparing for starting a match. In this process, a process of constructing a virtual three-dimensional space in which a virtual court is placed and of placing various objects such as the player character PC and the opponent character NPC is executed. Then, an image of the virtual space in which various objects are placed is captured by a virtual camera, whereby a game image is generated, and the image is outputted to a stationary monitor or the like. Further, initialization of various types of data to be used in the processes below is also performed. Then, for example, a process of displaying a match start representation is performed, and then, a match is started.

Figure 25:
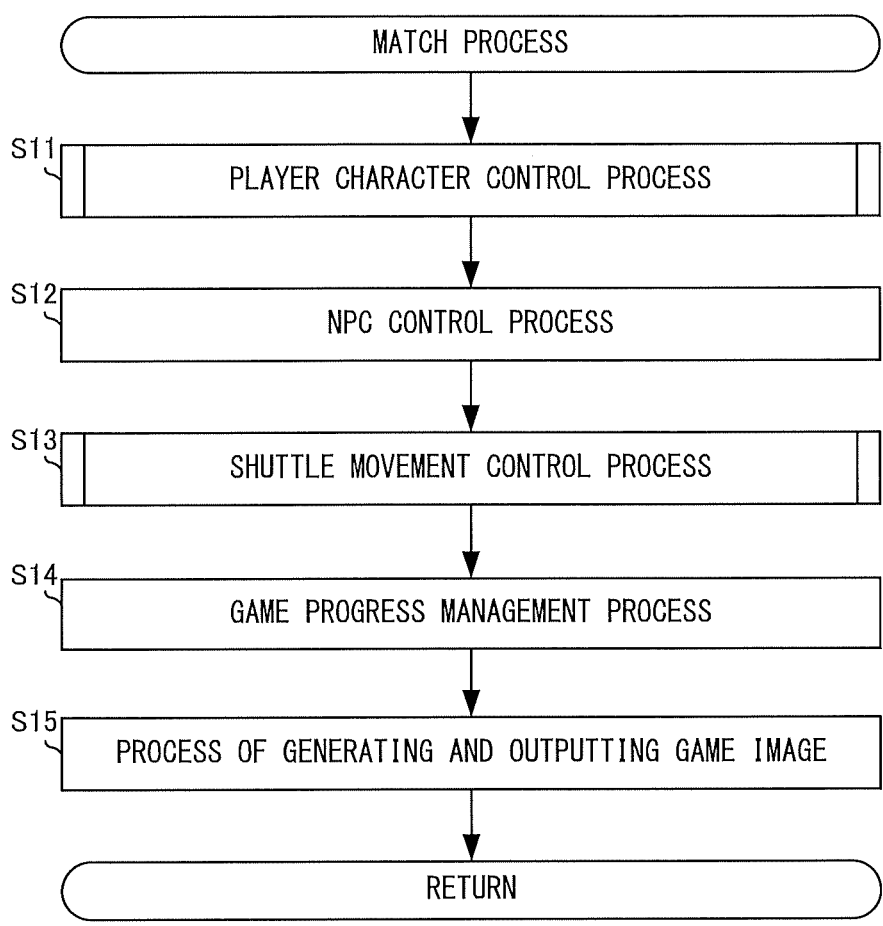
FIG. 25 is a non-limiting example of a flowchart showing details of a match process.

Next, in step S2, the processor 81 executes a match process. FIG. 25 is a flowchart showing details of the match process.

[Control of Player Character]

Figure 26:
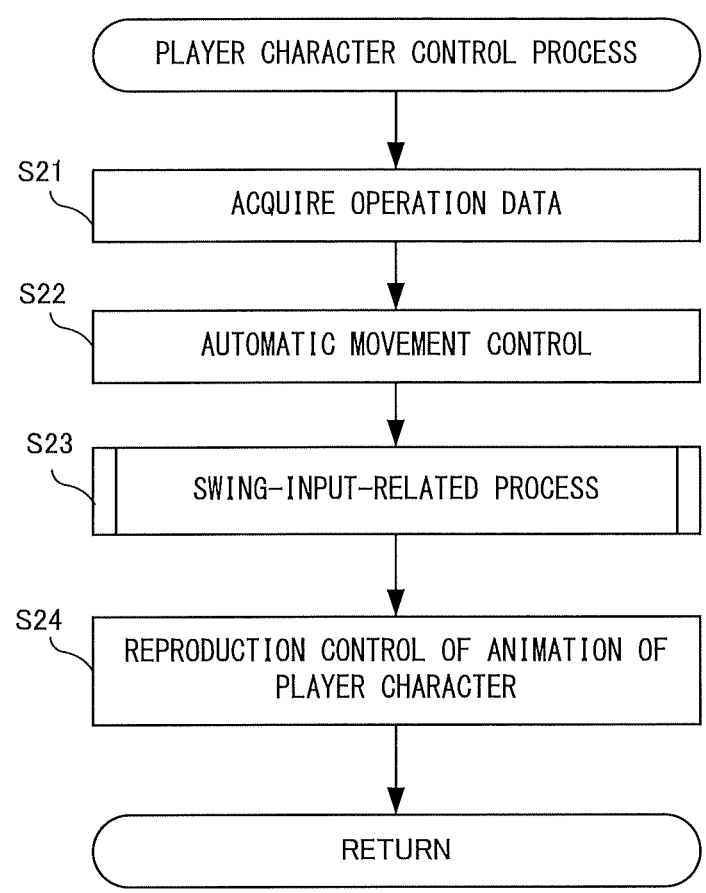
FIG. 26 is a non-limiting example of a flowchart showing details of a player character control process.

In FIG. 25, first, in step S11, the processor 81 executes a player character control process. FIG. 26 is a flowchart showing details of the player character control process. In FIG. 26, first, in step S21, the processor 81 acquires the operation data 306.

[Automatic Movement Control]

Next, in step S22, the processor 81 performs an automatic movement control on the player character PC. Specifically, the processor 81 determines a movement destination of the shuttle 203 on the basis of the shuttle movement parameter 305. Further, the processor 81 calculates, as the above-described automatic movement destination data 334, a position at which the shuttle 203 can be hit back. Then, the processor 81 performs a control (update of the character position data 332) of moving the player character PC toward the automatic movement destination. Further, the processor 81 manages transition of the player state associated with start/end of movement, and sets, as appropriate, information indicating "standby" or "moving" to the player state data 335. Further, the processor 81 sets, as appropriate, information that designates an animation corresponding to the player state of "standby" or "moving", to the reproduction animation designation information 309.

[Swing-Input-Related Process]

Next, in step S23, the processor 81 executes a swing-input-related process. In this process, detection of a swing input, a determination process of a swing direction using the above-described learned model, a determination process of shot occurrence, and the like are performed.

Figure 27:
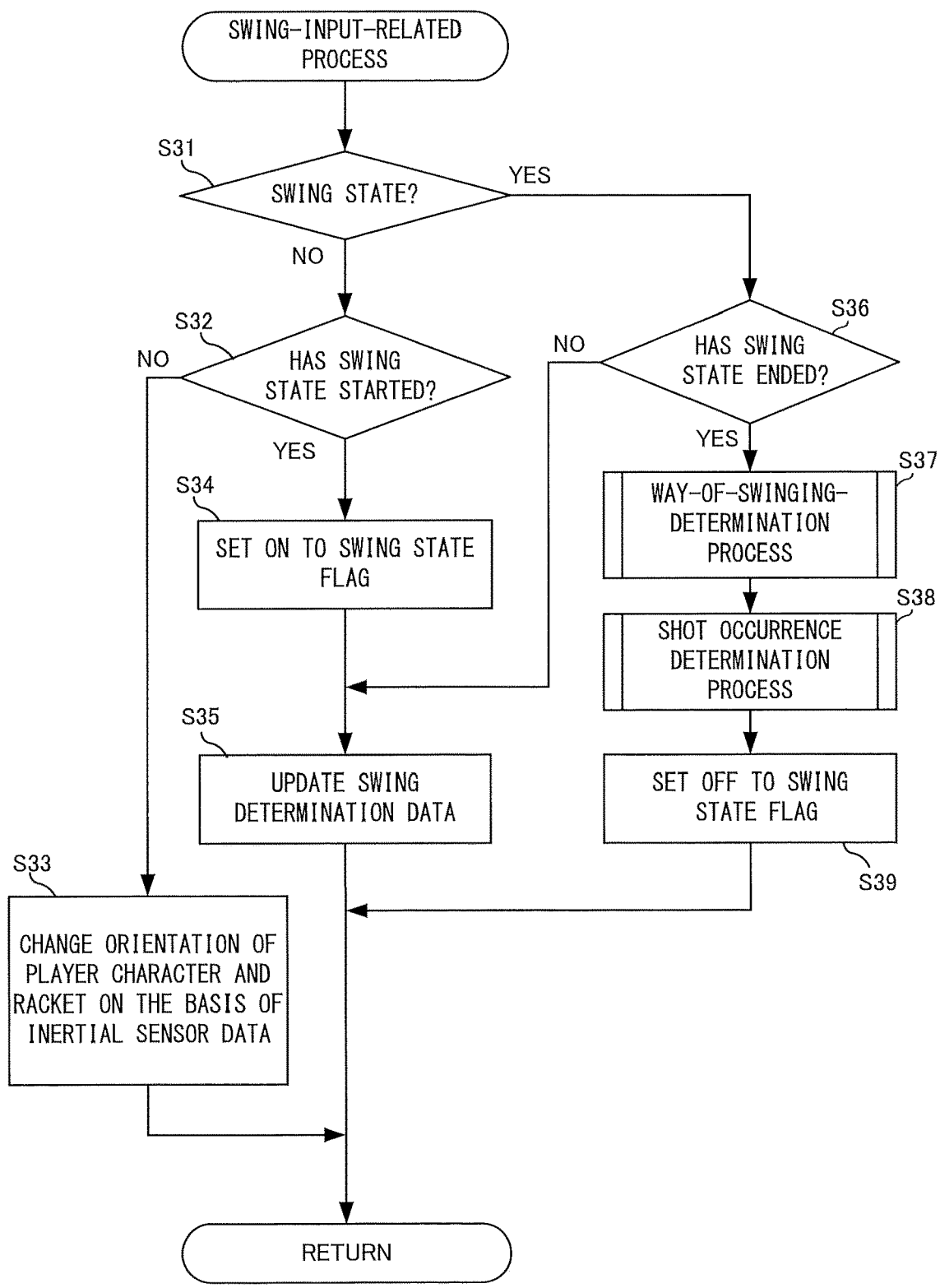
FIG. 27 is a non-limiting example of a flowchart showing details of a swing-input-related process.

FIG. 27 is a flowchart showing details of the swing-input-related process. In FIG. 27, first, in step S31, the processor 81 determines whether or not the current state is a swing state on the basis of the swing state flag 311. As a result of the determination, when the current state is not a swing state (NO in step S31), the processor 81 determines, in step S32, whether or not start of a swing input has been detected, i.e., whether or not a swing state has started, on the basis of the swing determination data 307. The detection method of start and end of a swing state may be any method. For example, when change in the acceleration indicated by acceleration data included in the operation data 306 has become equal to or greater than a predetermined threshold, it may be determined that a swing state has started. Further, with respect to end of a swing state, when the magnitude of the acceleration indicated by the acceleration data has reached a peak after it has been determined that the swing state has started, and then, the magnitude of the acceleration has been attenuated to some extent, it may be determined that the swing state has ended. Then, on the basis of the end of the swing state, it may be determined that a swing input has been performed.

As a result of the above determination, when a swing state has not started (NO in step S32), the processor 81 changes, in step S33, the orientation (and the orientation of the racket) of the player character PC on the basis of the inertial sensor data. That is, the processor 81 calculates an orientation of the controller at that time on the basis of the inertial sensor data, and reflects this orientation to the orientation of the player character PC. That is, in a case where the controller is not swung, motion and change in the orientation of the controller itself caused by the user are reflected to the orientation of the player character PC and the racket (in other words, a state where the player character PC holds the racket is established). Then, the processor 81 ends the swing-input-related process.

Meanwhile, as a result of the determination in step S32, when a swing state has started (YES in step S32), the processor 81 sets ON to the swing state flag 311 in step S34.

Next, in step S35, the processor 81 updates the swing determination data 307. Specifically, the processor 81 stores, into the swing determination data 307, inertial sensor data included in the above operation data. That is, in the period of the swing state, a process of accumulating the inertial sensor data into the swing determination data 307 for each frame is executed. At this time, on the basis of the data of the acceleration and the angular velocity, orientation data indicating the orientation of the controller is also calculated, and this orientation data is also accumulated in the swing determination data 307. Then, the processor 81 ends the swing-input-related process.

Next, a process performed when, as a result of the determination in step S31, it has been determined (YES in step S31) that the state is a swing state, will be described. In this case, first, in step S36, the processor 81 determines whether or not the swing state has ended. The determination method of the ending has been described above. As a result of the determination, when the swing state has not ended (NO in step S36), the process is advanced to step S35, and update of the swing determination data 307 is performed.

Figure 28:
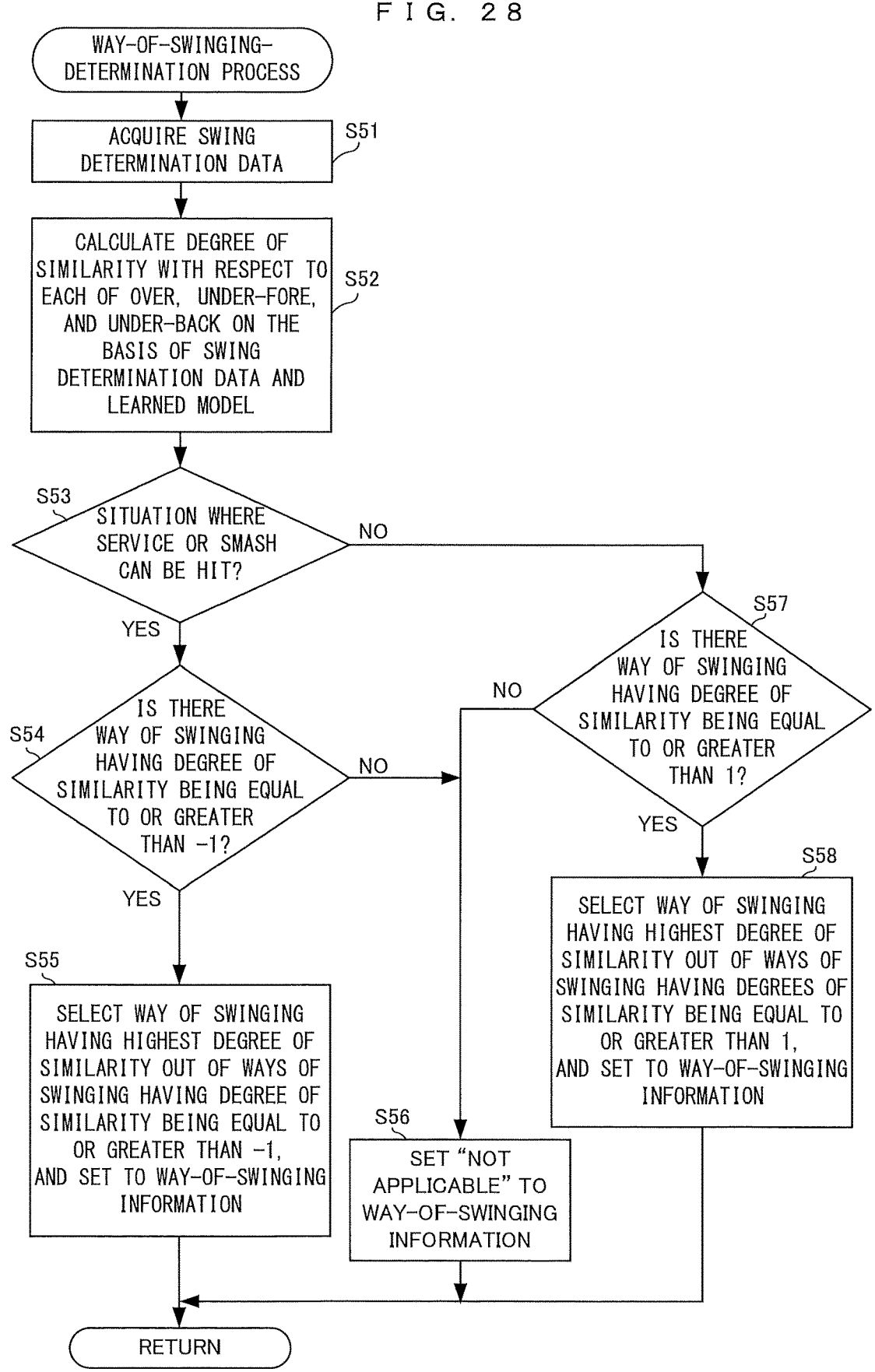
FIG. 28 is a non-limiting example of a flowchart showing details of a way-of-swinging-determination process.

Meanwhile, when it has been determined that the swing state has ended (YES in step S36), the processor 81 executes a way-of-swinging-determination process in step S37. In this process, on the basis of the degree of similarity between the way of swinging according to the swing state and the three types of ways of swinging, a process of determining the way of swinging that has been performed this time is performed. FIG. 28 is a flowchart showing details of the way-of-swinging-determination process. In FIG. 28, first, in step S51, the processor 81 acquires the swing determination data 307. Next, in step S52, the processor 81 performs a process of calculating the above degree of similarity using the swing determination data 307 and the learned model 302. Specifically, the processor 81 inputs, to the learned model 302, data of the acceleration, the angular velocity, and the orientation of the controller in the period of the swing state of this time (swing input data shown in FIG. 16). As the output result, the degree of similarity between the swing input (the way of swinging) performed by the user this time and each of Over, Under-Fore, and Under-Back is calculated.

Next, in step S53, the processor 81 determines whether or not the current game situation is a situation where a service or a smash can be hit. In the exemplary embodiment, whether or not the situation is a situation where a service can be hit can be determined on the basis of the progress management data 310 (the service flag). Further, whether or not the situation is a situation where a smash can be hit can be determined on the basis of whether or not the position of the shuttle 203 is in the smash-allowed region.

As a result of the above determination, when the situation is a situation where either a service or a smash can be hit (YES in step S53), the processor 81 determines, in step S54, with reference to the calculated three degrees of similarity, whether or not there is a way of swinging of which the value of the degree of similarity is equal to or greater than a first threshold, specifically, "−1". As a result of the determination, when there is a way of swinging that has a degree of similarity being equal to or greater than "−1" (YES in step S54), the processor 81 sets, in step S55, to the way-of-swinging information 308, information indicating the way of swinging that has a degree of similarity being equal to or greater than "−1". As a result, in the way-of-swinging information 308, information indicating one of "Over", "Under-Fore", and "Under-Back" is set. When there are two or more ways of swinging that have a degree of similarity being equal to or greater than "4", the processor 81 selects a way of swinging that has the highest degree of similarity out of these ways of swinging, and sets information indicating this way of swinging, to the way-of-swinging information 308. Then, the processor 81 ends the way-of-swinging-determination process.

Meanwhile, when there is no way of swinging that has a degree of similarity being equal to or greater than "4", that is, the degree of similarity is less than "−1" with respect to all of the three types of ways of swinging (NO in step S54), the processor 81 sets information indicating "not applicable", to the way-of-swinging information 308 in step S56. Then, the processor 81 ends the way-of-swinging-determination process.

Next, a case where, as a result of the determination of step S53, it has been determined that the situation is a situation where neither a service nor a smash can be hit (NO in step S53), will be described. In this case, in step S57, the processor 81 refers to the calculated three degrees of similarity, and determines whether or not there is a way of swinging of which the value of the degree of similarity is equal to or greater than a second threshold, which is greater than the first threshold, specifically, "+1". As a result of the determination, when there is a way of swinging that has a degree of similarity being equal to or greater than "+1" (YES in step S57), and then, in step S58, there is only one way of swinging that has a degree of similarity being equal to or greater than "+1", the processor 81 sets information indicating this way of swinging, to the way-of-swinging information 308. When there are two or more ways of swinging that have a degree of similarity being equal to or greater than "+1", the processor 81 selects a way of swinging that has the highest degree of similarity out of these ways of swinging, and sets information indicating this way of swinging, to the way-of-swinging information 308. Then, the processor 81 ends the way-of-swinging-determination process.

Meanwhile, when there is no way of swinging that has a degree of similarity being equal to or greater than "+1", that is, when the degree of similarity is less than "+1" with respect to all of the three types of ways of swinging (NO in step S57), the process is advanced to step S56, and the processor 81 sets information indicating "not applicable", to the way-of-swinging information 308. Then, the processor 81 ends the way-of-swinging-determination process.

Here, in the exemplary embodiment, as described above, the first threshold is a value smaller than the second threshold. Therefore, when the situation is a situation where a service or a smash can be hit, it is allowed to easily determine that a swing input according to any one of the ways of swinging has been performed, even when the degree of similarity is slightly low. The reason why different thresholds (determination conditions) are used between a state where a service or a smash can be hit and a state where neither a service nor a smash can be hit, will be supplementarily described. First, a case of a service will be described. In a badminton game, when an operation for a service is performed, the user moves an arm (motion of Under-Fore in the exemplary embodiment) so as to swing up the controller. However, it is considered that, when hitting a service, many users perform a swinging up motion to a smaller extent than when performing a swinging up motion at the time of hitting back in a situation other than hitting a service. That is, although the type of motion is the same swinging up (Under-Fore), it is assumed that the magnitude of the motion is likely to be small. In this case, there is a risk that the data amount due to a swing input to be used in calculation of the degree of similarity is reduced (compared with that when ordinary hitting back is performed), resulting in a decreased determination accuracy. Therefore, in the exemplary embodiment, the determination condition is made milder for a situation where a service is hit than for a situation where a service is not hit, whereby it can be easily determined that a way of swinging of Under-Fore has been performed, even when the degree of similarity is slightly low.

Next, a case of a smash will be described. In a case of a smash, similar to the case of a service, different thresholds (determination conditions) are used as a countermeasure against the risk of decrease of the recognition accuracy. Specifically, when the user has recognized that the situation is a situation where a smash can be hit, such as when, in the game processing, visual indication that "this is a chance for a smash" is shown to the user, the user having recognized this may try to hit a smash in haste. Thus, it is assumed that, as a result of the user swinging the controller in haste so as to hit a smash, the way of swinging of the controller becomes rough. As a result of such a rough way of swinging, the determination accuracy (determination of Over in this case) may be decreased. Therefore, also in a case of a situation where a smash can be hit, the determination condition is made mild so that a smash can easily occur (even when the way of swinging is rough).

Specific values of the first threshold and the second threshold are not limited to those mentioned above, and may be adjusted as appropriate from the viewpoint of game balance and the like.

With reference back to FIG. 27, next, in step S38, the processor 81 executes a shot occurrence determination process. In this process, on the basis of the swing input performed this time and the positional relationship between the shuttle 203 and the player character PC, determination as to whether or not a shot (hitting back of the shuttle 203) occurs, and necessary setting associated with the determination, are performed.

Figure 29:
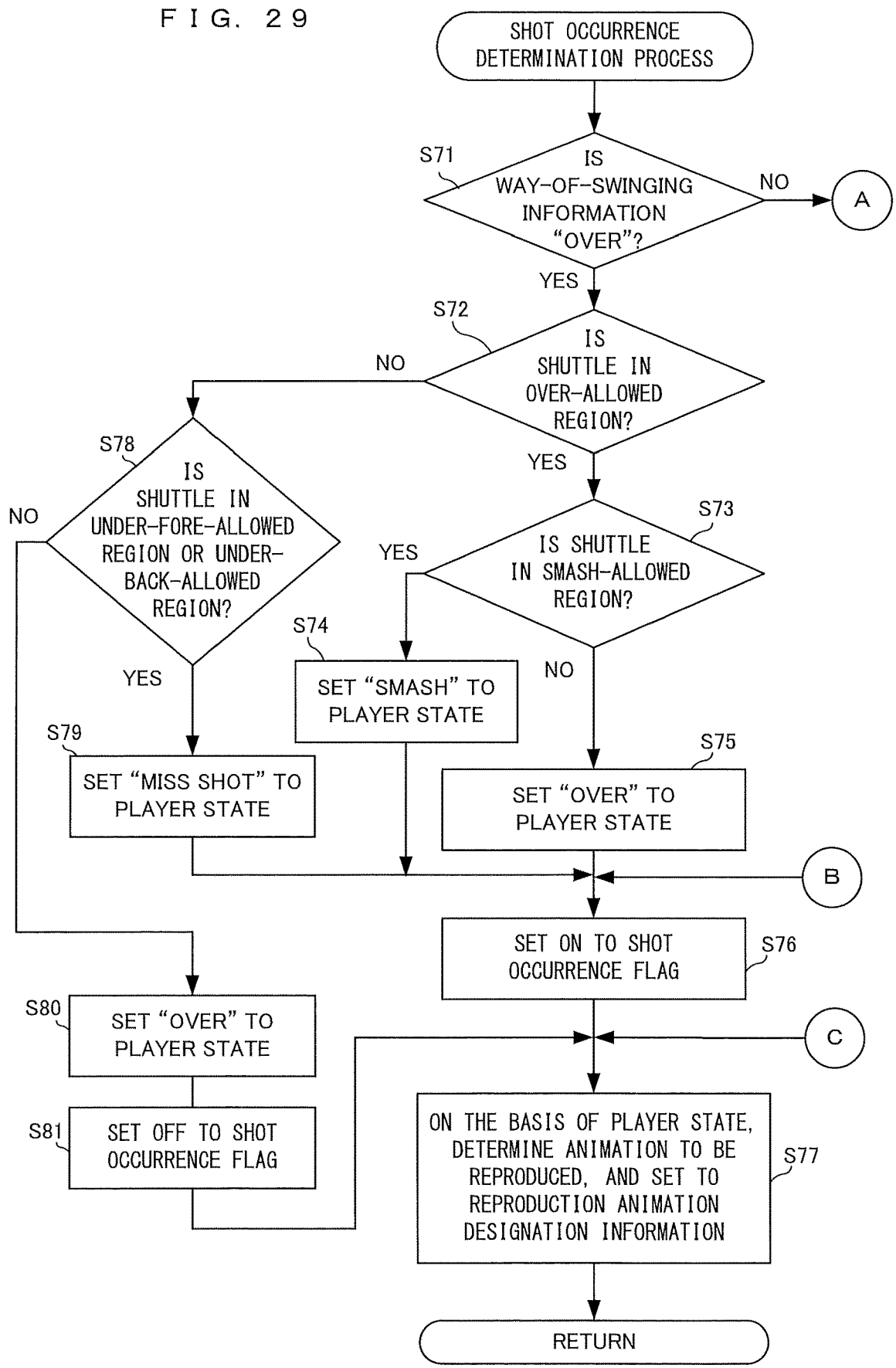
FIG. 29 is a non-limiting example of a flowchart showing details of a shot occurrence determination process.
Figure 30:
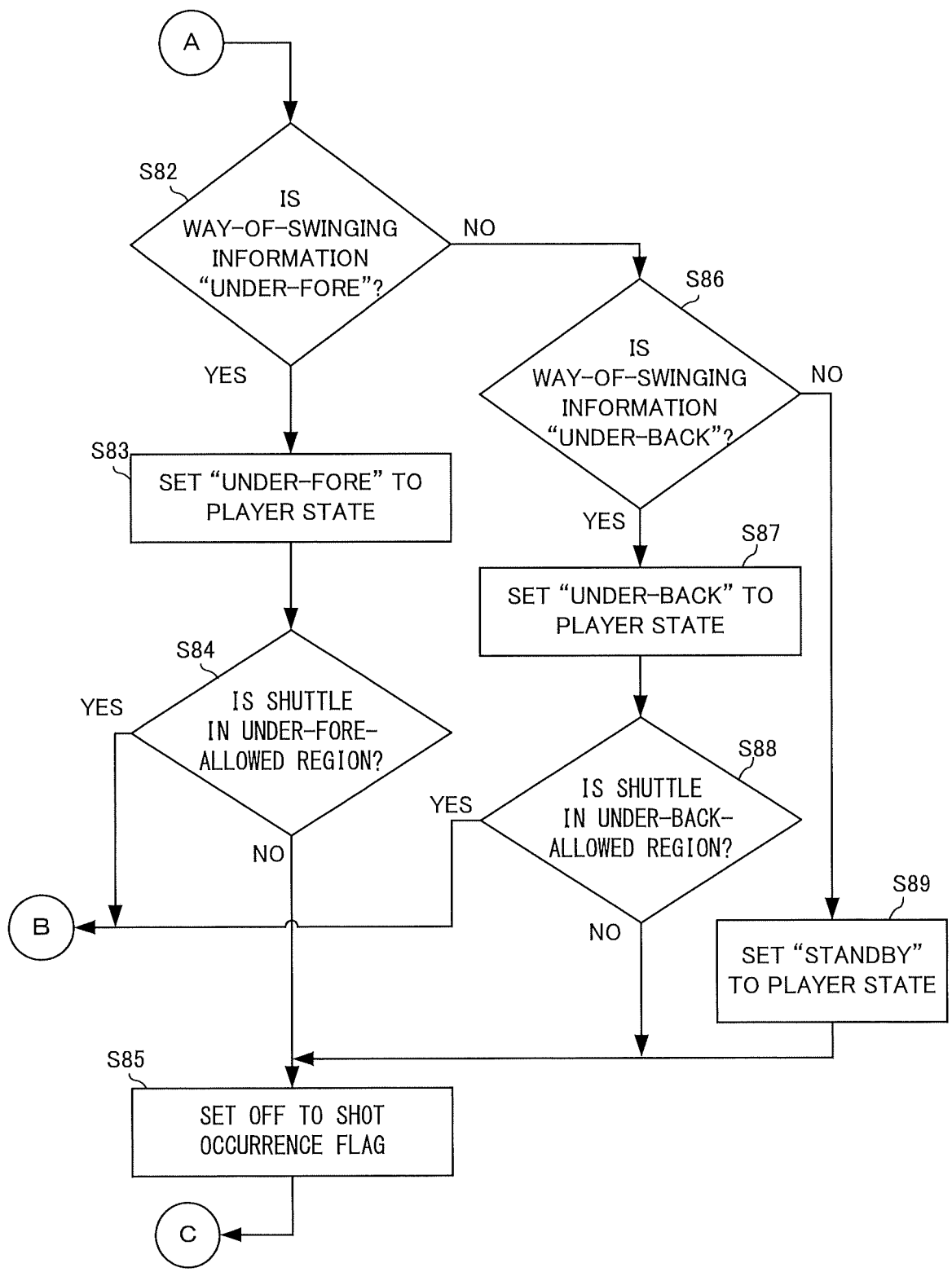
FIG. 30 is a non-limiting example of a flowchart showing details of a shot occurrence determination process.

FIG. 29 and FIG. 30 are flowcharts showing details of the shot occurrence determination process. In FIG. 29, first, in step S71, the processor 81 determines whether or not the way-of-swinging information 308 is "Over". As a result of the determination, when the way-of-swinging information 308 is "Over" (YES in step S71), the processor 81 determines, in step S72, whether or not the shuttle 203 is present in the Over-allowed region as shown in FIG. 20. As a result of the determination, when the shuttle 203 is present (YES in step S72), the processor 81 further determines, in step S73, whether or not the shuttle 203 is present in the smash-allowed region. As a result of the determination, when the shuttle 203 is present in the smash-allowed region (YES in step S73), the processor 81 sets "smash" to the player state data 335 in step S74. Meanwhile, when the shuttle 203 is not present in the smash-allowed region (NO in step S73), the processor 81 sets "Over" to the player state data 335 in step S75.

Next, in step S76, the processor 81 sets ON to the shot occurrence flag 312.

Next, in step S77, the processor 81 sets a racket swinging animation to be performed by the player character PC. Specifically, on the basis of the player state data 335, the processor 81 determines a racket swinging animation to be reproduced. Then, the processor 81 sets, to the reproduction animation designation information 309, information that designates an animation according to the determined racket swinging animation. For example, when the player state data 335 is "Over", an animation of a racket swinging animation corresponding to "Over" is set to the reproduction animation designation information 309. As described above, in a case where, as a racket swinging animation corresponding to a single way of swinging, a plurality of animations corresponding to the height of the shuttle 203 are used, an animation corresponding to the height of the shuttle 203 at this time point may be selected to be set to the reproduction animation designation information 309.

Then, the processor 81 ends the shot occurrence determination process.

Next, a case where, as a result of the determination in step S72, the shuttle 203 is not present in the Over-allowed region (NO in step S72), will be described. In this case, in step S78, the processor 81 determines whether or not the shuttle 203 is present in the Under-Fore-allowed region or the Under-Back-allowed region. As a result of the determination, when the shuttle 203 is present in the Under-Fore-allowed region or the Under-Back-allowed region (YES in step S78), the processor 81 sets "miss shot" to the player state data 335 in step S79. That is, when a swing input of Under-Fore or Under-Back has been performed in a situation where the shuttle 203 should be hit back by Over, setting for treating the shot as a miss shot is performed. Then, the process is advanced to step S76 (it should be noted that, since a miss shot is not a swing and miss, ON is set to the shot occurrence flag 312).

Meanwhile, as a result of the above determination, when the shuttle 203 is not present in the Under-Fore-allowed region or the Under-Back-allowed region (NO in step S78), the processor 81 sets "Over" to the player state data 335 in step S80. Next, in step S81, the processor 81 sets OFF to the shot occurrence flag 312. That is, in this case, a process in which a racket swinging animation of "Over" is performed but no shot occurs, resulting in a swing and miss, is performed. Then, the process is advanced to step S77.

Next, a case where, as a result of the determination in step S71, the way-of-swinging information 308 is not "Over" (NO in step S71), is described. In this case, in step S82 in FIG. 30, the processor 81 determines whether or not the way-of-swinging information 308 is "Under-Fore". As result of the determination, when the way-of-swinging information 308 is "Under-Fore" (YES in step S82), the processor 81 sets "Under-Fore" to the player state data 335 in step S83. Next, in step S84, the processor 81 determines whether or not the shuttle 203 is present in the Under-Fore-allowed region. As result of the determination, when the shuttle 203 is present in the Under-Fore-allowed region (YES in step S84), the process is advanced to step S76. Meanwhile, when the shuttle 203 is not present in the Under-Fore-allowed region (NO in step S84), the processor 81 sets OFF to the shot occurrence flag 312 in step S85. That is, setting for causing a swing and miss is performed. Then, the process is advanced to step S77.

Meanwhile, as a result of the determination in step S82, when the way-of-swinging information 308 is not "Under-Fore" (NO in step S82), the processor 81 next determines whether or not the way-of-swinging information 308 is "Under-Back" in step S86. As result of the determination, when the way-of-swinging information 308 is "Under-Back" (YES in step S86), the processor 81 sets "Under-Back" to the player state data 335 in step S87. Next, in step S88, the processor 81 determines whether or not the shuttle 203 is present in the Under-Back-allowed region. As result of the determination when the shuttle 203 is present in the Under-Back-allowed region (YES in step S88), the process is advanced to step S76. Meanwhile, when the shuttle 203 is not present in the Under-Back-allowed region (NO in step S88), the process is advanced to step S85.

Meanwhile, as a result of the determination in step S86, when the way-of-swinging information 308 is not "Under-Back" (NO in step S86), this means that "not applicable" is set to the way-of-swinging information 308. In this case, in step S89, "standby" is set to the player state data 335. Then, the process is advanced to step S85. That is, in a case where, although the user has performed a swing input, it has been determined that the swing input is not similar to any of the three types of ways of swinging, the player character PC does not perform any racket swinging animation.

With reference back to FIG. 27, next, in step S39, the processor 81 sets OFF to the swing state flag 311. Then, the processor 81 ends the swing-input-related process.

[Control of Animation of Player Character]

With reference back to FIG. 26, next, in step S24, the processor 81 performs a reproduction control of an animation of the player character PC. The processor 81 reproduces an animation (including a racket swinging animation) set in the reproduction animation designation information 309. Further, when reproduction of a predetermined animation has ended, the processor updates the content of the player state data 335 as appropriate. For example, when reproduction of a racket swinging animation has ended, "standby" or "moving" is set to the player state data 335 in accordance with the situation of the player character PC at that time. Then, the processor 81 ends the player character control process.

[Control of Opponent Character]

With reference back to FIG. 25, next, in step S12, the processor 81 executes an NPC control process. This process is a process for performing AI control on the opponent character NPC. The subject that performs the operation is the processor 81 (AI), but as the basic processing, a control similar to that in the player character control process described above is performed.

[Shuttle Movement Control]

Figure 31:
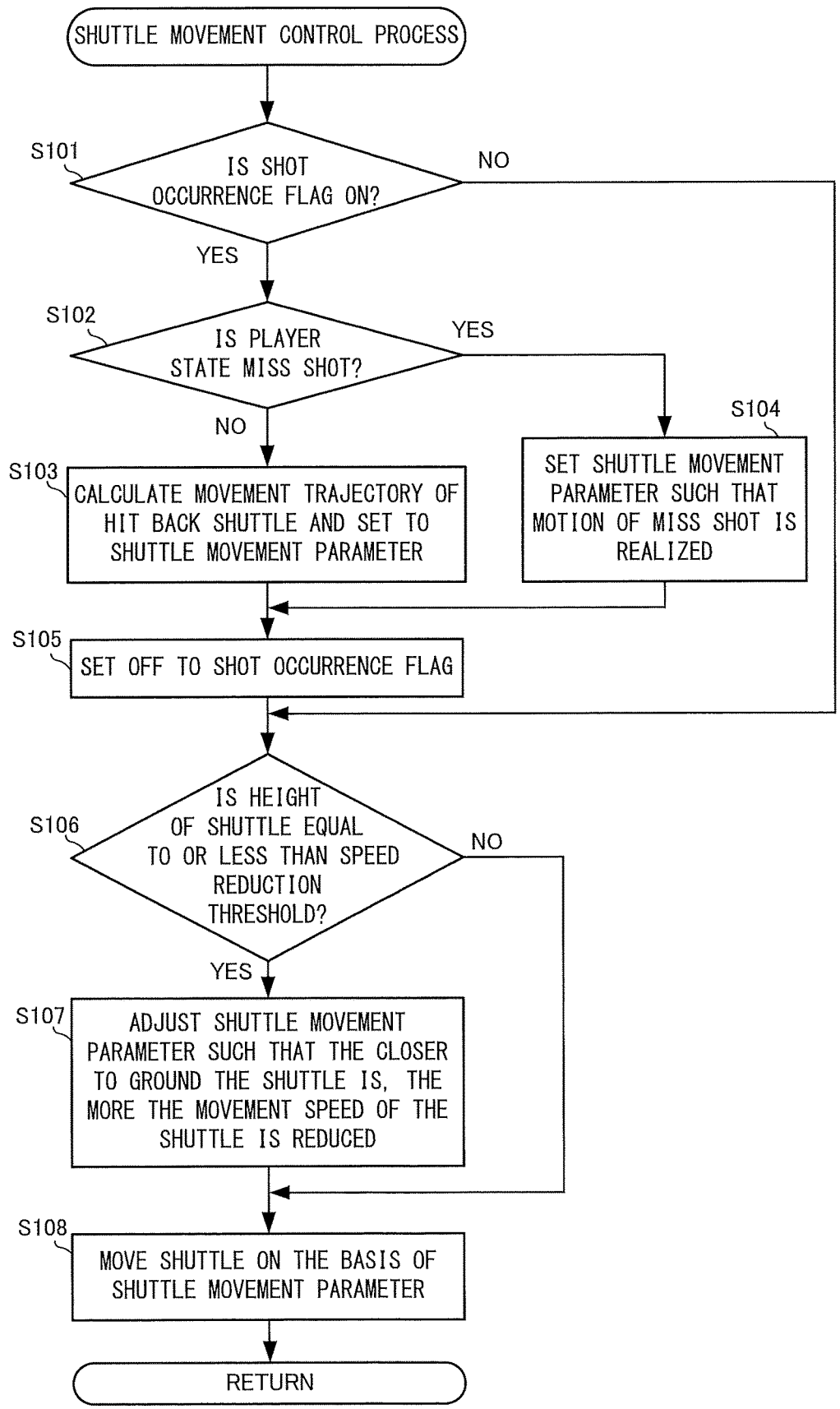
FIG. 31 is a non-limiting example of a flowchart showing details of a shuttle movement control process.

Next, in step S13, the processor 81 executes a shuttle movement control process. FIG. 31 is a flowchart showing details of the shuttle movement control process. In FIG. 31, first, in step S101, the processor 81 determines whether or not the shot occurrence flag 312 is ON. As result of the determination, when the shot occurrence flag 312 is OFF (NO in step S101), the process is advanced to step S106 described later. Meanwhile, when the shot occurrence flag 312 is ON (YES in step S101), hitting back of the shuttle 203 has occurred. Thus, next, in step S102, the processor 81 determines whether or not the player state is "miss shot", on the basis of the player state data 335. As result of the determination, when the player state is not "miss shot" (NO in step S102), the processor 81 calculates, in step S103, movement parameters of the shuttle 203 having been hit back (which is not a miss shot). Specifically, on the basis of the content of the swing input such as a swing speed, and the content (whether the shot is Over, Under-Fore, etc.) of the shot performed this time, the movement trajectory and the movement speed of the shuttle 203 are calculated. Then, the processor 81 sets the calculated parameters to the shuttle movement parameter 305. Then, the process is advanced to step S105.

Meanwhile, when the player state is "miss shot" (YES in step S102), the processor 81 calculates, in step S104, the shuttle movement parameter 305 such that the motion of the shuttle 203 becomes the motion of the case of a miss shot. For example, the processor 81 sets the parameter of the movement speed such that the movement speed becomes slower than ordinary, sets the movement trajectory so as to be a wobbly trajectory, or sets ON to a flag indicating that the shuttle 203 is in a state of having been a miss shot.

Next, in step S105, the processor 81 sets OFF to the shot occurrence flag 312.

Next, the processor 81 performs a speed reduction adjustment control that is performed when the shuttle 203 is close to the ground to some extent, as described above. First, in step S106, the processor 81 determines whether or not the height of the shuttle 203 is equal to or less than a speed reduction threshold, which is a height set in advance as a threshold for performing speed reduction adjustment. As result of the determination, when the height of the shuttle 203 is equal to or less than the speed reduction threshold (YES in step S106), the processor 81 adjusts, in step S107, the content of the shuttle movement parameter 305 such that the movement speed of the shuttle 203 is reduced at a speed reduction ratio corresponding to the height from the ground. That is, adjustment is performed such that the closer to the ground the shuttle 203 is, the more the movement speed of the shuttle 203 is reduced.

Meanwhile, when the height of the shuttle 203 is not equal to or less than the speed reduction threshold (NO in step S106), the process of step S107 is skipped.

Next, in step S108, the processor 81 moves the shuttle 203 on the basis of the shuttle movement parameter 305. Then, the shuttle movement control process ends.

[Match Progress Management]

With reference back to FIG. 25, next, in step S14, the processor 81 executes a game progress management process. In this process, determination of a point, score management, and the like are performed. Further, in an aspect where a service is to be hit, the processor 81 also performs a process of setting the service flag to ON, and setting the service flag to OFF after the service has been hit. When a condition for ending a match has been satisfied, the processor 81 sets ON to an end flag for indicating the end of the match, for example.

[Generation and Output of Game Image]

Next, in step S15, the processor 81 generates a game image. That is, the processor 81 generates a game image by causing a virtual camera to capture an image of the virtual space in which the above processes have been reflected. Then, the processor 81 outputs the generated game image to a stationary monitor or the like. Then, the match process ends.

With reference back to FIG. 24, next, in step S3, the processor 81 determines whether or not the match has ended, on the basis of the progress management data 310. As a result of the determination, when the match has not ended (NO in step S3), the process is returned to step S2 and the processes are repeated. When the match has ended (YES in step S3), the processor 81 performs a representation process of displaying a match result and the like as appropriate, and ends the badminton game processing.

This is the end of detailed description of the badminton game processing according to the exemplary embodiment.

As described above, in the exemplary embodiment, in a badminton game in which the three types of ways of swinging as described above are selectively used, the degrees of similarity of the three types of ways of swinging (swing directions) are calculated by using a learned model. Then, on the basis of this, the way of swinging according to the swing input performed by the user is determined. Accordingly, determination accuracy of the way of swinging can be improved. Meanwhile, a swing input is an analog input caused by movement of an arm (wrist) of the user. Thus, even if, for example, the same type of Under-Fore motion (in the present example, swinging up toward the upper left) is performed, there may be large individual differences in the ways of swinging between users because of differences in the ways of swinging and habits at the time of swinging of individual users. When it is desired to determine a plurality of types of ways of swinging but the individual differences in the respective ways of swinging are assumed to be large, if a method in which specific values or ranges of the acceleration, the angular velocity, and the like are set for each way of swinging in coding of a program is adopted, there is a risk that the individual differences in the ways of swinging cannot be absorbed and a sufficient determination accuracy cannot be obtained. In this regard, when similarity determination by the learned model is used as in the exemplary embodiment, the individual differences as described above can be coped with, and improvement of determination accuracy of the way of swinging according to a swing input can be expected. Further, in the processes according to the exemplary embodiment, the greater the number of the types of the ways of swinging to be determined is, the higher the usefulness becomes.

The above processes can be considered as game processing in which a swing input performed by the user is classified to one of the three types of ways of swinging, and the swing input according to the way of swinging is assumed to have been performed.

[Modification]

In the exemplary embodiment, an example case where three types of ways of swinging (swing directions) are determined has been shown. However, the processes described above can also be applied to a case where two types of ways of swinging are determined, and to a case where four or more types of ways of swinging are determined. As described above, the greater the number of types of ways of swinging to be determined is, the higher the usefulness of the processes according to the exemplary embodiment becomes.

In the exemplary embodiment, in the way-of-swinging-determination process, when there is no way of swinging that has a degree of similarity being equal to or greater than the first threshold or the second threshold, it is determined that the way of swinging by the user is not similar to any of the three types of ways of swinging, and the player character PC is not allowed to perform a racket swinging animation. In another exemplary embodiment, even in this case, a way of swinging that has the highest degree of similarity may be selected. That is, a determination method that does not use the first threshold and the second threshold may be adopted. In this case, with respect to a swing input, a racket swinging animation corresponding to one of the three types of ways of swinging is reproduced without fail (then, if the timing is met, a shot can also occur).

In still another exemplary embodiment, when it has been determined that the way of swinging by the user is not similar to any of the three types of ways of swinging, the player character PC may be allowed to perform a racket swinging animation in such a manner as to reflect the content of the swing input as is. That is, a racket swinging animation that is not any of the three types of ways of swinging may be reproduced. In this case, a process may be performed such that, although a racket swinging animation is performed, the shuttle 203 is not hit back, resulting in a swing and miss.

In the exemplary embodiment, as an element of the basis, such as a learning data set, for determination as to the way of swinging, data obtained from inertial sensors is used. Other than this, for example, a learned model generated through deep learning using image data may be used in combination, and similarity of the way of swinging may be determined. For example, captured images (moving image) of a user swinging the controller may be used as a learning data set, to create a learned model. Then, a game system in which images of the user can be captured by a predetermined camera in a game play is configured, and image data obtained from this camera is inputted to the learned model based on images, whereby similarity may be determined. Then, this is supplementarily used in addition to the similarity determination based on the data of the inertial sensors, whereby determination may be performed. Accordingly, further improvement of determination accuracy can be expected.

In another exemplary embodiment, in accordance with the magnitude of the degree of similarity, operation of the shuttle 203 having been hit back may be changed. For example, a control may be performed such that, even when hitting back by the same type of "Over" is performed, the higher the degree of similarity is, the higher the shuttle speed becomes. In other words, when the degree of similarity is higher, the form is considered to be closer to an "ideal form", and an advantageous effect for the progress of the game may be obtained when compared with a case where the degree of similarity is low.

In the exemplary embodiment, with respect to the similarity determination as to the way of swinging, the transition of a series of (a plurality of) changes in acceleration and the like in a period from the start of a swing state to the end of the swing state is compared. In another exemplary embodiment, similarity may be determined by using swing input data based on a single frame. For example, with respect to swing input data in one of frames in the period, similarity determination as described above may be performed.

In the exemplary embodiment, in a situation where a smash or a service can be hit, determination is performed by using the first threshold having a smaller value than the second threshold. In another exemplary embodiment, with respect to only one type of way of swinging, out of the three types of ways of swinging, that has been selected in accordance with the game situation, determination may be performed by using such a small threshold as above. That is, in accordance with the game situation, a specific way of swinging out of the three types of ways of swinging may be more easily determined than the other ways of swinging.

In another exemplary embodiment, the first threshold and the second threshold that are used in the way-of-swinging-determination process may be dynamically customizable for each user. For example, with respect to the degree of similarity calculated in the way-of-swinging-determination process, statistics may be taken for each user (a precondition is that each user can be identified by performing a predetermined log-in process or the like at the game start). Then, statistics of the degree of similarity of each of the three types of ways of swinging are taken, and on the basis of the result of the statistics, the values to be used as the first threshold and the second threshold may be adjusted. For example, a case where the degree of similarity of Over is often a value in a range of +15 to +25, and the degree of similarity of Under-Fore is often a value in a range of +1 to +3, is assumed. In this case, adjustment may be performed such that the threshold to be used in determination of Under-Fore of which the value of the degree of similarity is a little low is slightly decreased so that Under-Fore can be easily determined. Then, the adjustment result may be saved as personal data provided for each user.

In the above example, a badminton game has been described. Other than this, the above processes can also be applied to sports games in general in which a racket or a tool corresponding to the racket is swung. For example, the above process can also be applied to a sports game such as table tennis, tennis, or the like.

In the exemplary embodiment, a case in which a series of processes regarding the badminton game processing are executed in a single main body apparatus 2 has been described. In another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the main body apparatus 2 sends operation data indicating operations performed by the user to a predetermined server; various game processes are executed in the server; and the execution result is streaming-distributed as a moving image/sound to the main body apparatus 2.

While the exemplary embodiment has been described in detail, the foregoing description is in all aspects illustrative and not restrictive. It is to be understood that various modifications and variations can be made without departing from the scope of the exemplary embodiment.

What is claimed is:
1. A computer-readable non-transitory storage medium having stored therein instructions that, when executed by a processor of an information processing apparatus, cause the information processing apparatus to perform operations comprising:
   acquiring, from an operation device including an inertial sensor, operation data based on an output from the inertial sensor;

determining, based on the operation data, whether or not a swing input to the operation device has been performed;

inputting, to a learned model having learned so as to determine in which swing direction out of a plurality of swing directions the operation device has been swung, the operation data acquired in a period in which the swing input has been performed;

determining, based on an output from the learned model for the operation data that is input to the learned model, a swing direction in which the operation device has been swung;

executing game processing based on the swing direction in which the operation device has been determined to have been swung; and by using degrees of similarity that are outputted when the operation data has been inputted to the learned model, and that respectively correspond to a plurality of swing directions, determining which swing direction out of the plurality of swing directions the operation device has been swung in.

2. The storage medium according to claim 1, wherein the operations include at determination as to the swing direction, inputting, to the learned model, a plurality of the operation data progressively acquired in the period in which the swing input has been performed, and determining, based on an output from the learned model corresponding to the input, the swing direction in which the operation device has been swung.

3. The storage medium according to claim 1, wherein the operations include at determination as to the swing input, when a magnitude of an acceleration indicated by acceleration data included in the acquired operation data has exceeded a threshold, determining that the swing input has been started, and at a cancelation timing after the magnitude of the acceleration has reached a peak, determining that the swing input has been ended, and at determination as to the swing direction, determining the swing direction based on an output from the learned model corresponding to an input of a plurality of the operation data acquired from a time point at which the swing input has been started, till the cancelation timing.

4. The storage medium according to claim 1, wherein the operations include when the degrees of similarity respectively corresponding to two or more swing directions out of the plurality of swing directions each satisfy a predetermined similarity condition, determining that the operation device has been swung in a swing direction associated with a highest degree of similarity.

5. The storage medium according to claim 4, wherein the predetermined similarity condition regarding each degree of similarity is set so as to be different in accordance with a situation of a game caused by execution of the game processing.

6. The storage medium according to claim 4, wherein the operations include when an output from the learned model indicates that there is no swing direction that satisfies the predetermined similarity condition, executing the game processing, assuming that no swing input to the operation device has been performed.

7. The storage medium according to claim 4, wherein the operations include when an output from the learned model indicates that there is no swing direction that satisfies the predetermined similarity condition, changing an orientation of a player character object in accordance with change in an orientation of the operation device calculated based on the operation data based on the period in which the swing input has been performed.

8. The storage medium according to claim 4, wherein the operations include at determination as to the swing direction, when an output from the learned model indicates that there is no swing direction that satisfies the predetermined similarity condition, determining that, although the similarity condition is not satisfied, the operation device has been swung in a swing direction having a highest similarity to a swing direction calculated from the operation data, and at execution of the game processing, executing the game processing based on the swing direction.

9. The storage medium according to claim 1, wherein each teacher data includes a first parameter including at least a first magnitude of a acceleration or a first magnitude of angular velocity, and the operation data includes a second parameter including at least a second magnitude of acceleration or a second magnitude of angular velocity.

10. The storage medium according to claim 9, wherein the first parameter and the second parameter each further include orientation data indicating an orientation of the operation device.

11. The storage medium according to claim 10, wherein the operations include while it is determined that no swing input to the operation device has been performed, changing an orientation of a player character object placed in a virtual space, so as to be an orientation that corresponds to an orientation indicated by the orientation data calculated based on the operation data.

12. The storage medium according to claim 1, wherein the operations further include executing the game processing based on determination that the swing input has been performed at a timing that satisfies an execution condition during a game.

13. The storage medium according to claim 12, wherein the operations include based on determination that the swing input has been performed at the timing at which a position of a player character object placed in a virtual space and a position of a movement object are in a predetermined positional relationship, executing a process of moving the movement object based on the swing direction in which the operation device has been determined to have been swung.

14. The storage medium according to claim 13, wherein the operations further include moving the movement object at a predetermined speed, and when a height in the virtual space of the movement object is less than a predetermined height, performing speed reduction so as to realize a speed less than the predetermined speed, to move the movement object.

15. The storage medium according to claim 13, wherein the operations include when the predetermined positional relationship and the swing direction in which the operation device has been determined to have been swung satisfy a predetermined condition, executing the game processing so as to be more advantageous than when the predetermined positional relationship and the swing direction do not satisfy the predetermined condition.

16. A game system comprising:
a processor; and a memory coupled thereto, the processor being configured to control the game system to at least:
acquire, from an operation device including an inertial sensor, operation data based on an output from the inertial sensor;
determine, based on the operation data, whether or not a swing input to the operation device has been performed;
input, to a learned model having learned so as to determine in which swing direction out of a plurality of swing directions the operation device has been swung, the operation data acquired in a period in which the swing input has been performed;
determine, based on an output from the learned model for the operation data that is input to the learned model, a swing direction in which the operation device has been swung;
execute game processing based the swing direction in which the operation device has been determined to have been swung; and
by using degrees of similarity that are outputted when the operation data has been inputted to the learned model, and that respectively correspond to a plurality of swing directions, determining which swing direction out of the plurality of swing directions the operation device has been swung in.

17. A game apparatus comprising:
a processor; and a memory coupled thereto, the processor being configured to control the game apparatus to at least:
acquire, from an operation device including an inertial sensor, operation data based on an output from the inertial sensor;
determine, based on the operation data, whether or not a swing input to the operation device has been performed;
input, to a learned model having learned so as to determine in which swing direction out of a plurality of swing directions the operation device has been swung, the operation data acquired in a period in which the swing input has been performed, and determine a swing direction in which the operation device has been swung, based on an output from the learned model corresponding to the input; and
execute game processing based on the swing direction in which the operation device has been determined to have been swung; and
by using degrees of similarity that are outputted when the operation data has been inputted to the learned model, and that respectively correspond to a plurality of swing directions, determining which swing direction out of the plurality of swing directions the operation device has been swung in.

18. The game apparatus according to claim 17, wherein
at determination as to the swing input, when a magnitude of an acceleration indicated by acceleration data included in the acquired operation data has exceeded a threshold, it is determined that the swing input has been started, and at a cancelation timing after the magnitude of the acceleration has reached a peak, it is determined that the swing input has been ended, and
at determination as to the swing direction, the swing direction is determined based on an output from the learned model corresponding to an input of a plurality of the operation data acquired from a time point at which the swing input has been started, till the cancelation timing.

19. A game processing method executed by a processor controlling a game apparatus, for causing the processor to:
acquire, from an operation device including an inertial sensor, operation data based on an output from the inertial sensor;
determine, based on the operation data, whether or not a swing input to the operation device has been performed;
input, to a learned model having learned so as to determine in which swing direction out of a plurality of swing directions the operation device has been swung, the operation data acquired in a period in which the swing input has been performed;
determine, based on an output from the learned model for the operation data that is input to the learned model, a swing direction in which the operation device has been swung;
execute game processing based on the swing direction in which the operation device has been determined to have been swung; and
by using degrees of similarity that are outputted when the operation data has been inputted to the learned model, and that respectively correspond to a plurality of swing directions, determining which swing direction out of the plurality of swing directions the operation device has been swung in.

* * * * *